(12) United States Patent
Aoshima

(10) Patent No.: US 7,312,543 B2
(45) Date of Patent: Dec. 25, 2007

(54) DRIVING DEVICE

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/442,480

(22) Filed: May 26, 2006

(65) Prior Publication Data

US 2006/0267421 A1    Nov. 30, 2006

(30) Foreign Application Priority Data

May 31, 2005    (JP) .............................. 2005-159857

(51) Int. Cl.
*H02K 37/12*    (2006.01)
*H02K 37/14*    (2006.01)

(52) U.S. Cl. .............................. 310/49 R; 310/156.32; 310/268

(58) Field of Classification Search .............. 310/49 R, 310/156.32, 268, 257, 156.34, 156.35

See application file for complete search history.

(56) References Cited

U.S. PATENT DOCUMENTS

| | | | | |
|---|---|---|---|---|
| 3,700,942 | A | * | 10/1972 | Alth ........................... 310/164 |
| 3,989,967 | A | * | 11/1976 | Kikuyama et al. ........... 310/112 |
| 4,260,920 | A | * | 4/1981 | Nakamura et al. .......... 310/156.05 |
| 4,563,620 | A | * | 1/1986 | Komatsu ..................... 318/138 |
| 4,634,906 | A | * | 1/1987 | Grosjean .................. 310/49 R |
| 4,803,389 | A | * | 2/1989 | Ogawa et al. ............. 310/49 R |
| 6,781,772 | B2 | | 8/2004 | Miyawaki |
| 6,897,579 | B2 | | 5/2005 | Aoshima |

| | | | | |
|---|---|---|---|---|
| 2003/0062801 | A1 | * | 4/2003 | Aoshima .................... 310/261 |
| 2003/0201678 | A1 | * | 10/2003 | Huang et al. ............. 310/49 R |

FOREIGN PATENT DOCUMENTS

| | | |
|---|---|---|
| JP | 53-002774 A | 1/1978 |
| JP | 57-166847 A | 10/1982 |
| JP | 5-344701 A | 12/1993 |
| JP | 7-213041 A | 8/1995 |
| JP | 2000-50601 A | 2/2000 |
| JP | 2003-219623 A | 7/2003 |
| JP | 2004-045682 A | 2/2004 |

* cited by examiner

*Primary Examiner*—Darren Schuberg
*Assistant Examiner*—Alex W Mok
(74) *Attorney, Agent, or Firm*—Canon USA Inc IP Division

(57) ABSTRACT

A stepping motor includes a magnet having a magnetized portion, first and second coils, a first yoke having a first-magnetic-pole portion, a second yoke having a second-magnetic-pole portion, and a rotating yoke having a third-magnetic-pole portion fixed to the single surface of the magnet. The first coil is disposed outside of the outer-circumferential surface of the magnet, and the second coil is disposed inside of the inner-circumferential surface of the magnet so as to have the same concentricity as the magnet. The first and second magnetic-pole portions and the magnetized portion face each other across a certain gap. The cylindrical portion of the first yoke and the outermost-diameter portion of the rotating yoke face each other across a gap in the radial direction, and the cylindrical portion of the second yoke and the flat surface portion of the rotating yoke face each other across a gap in the shaft direction. Thus, an easy-to-assemble low-cost driving device having a thin shape in the shaft direction, and high output with small torque loss is provided.

4 Claims, 13 Drawing Sheets

DRIVING DEVICE

BACKGROUND OF THE INVENTION

1. Field of the Invention

The present invention relates to a driving device to be applied to a thin-disc-shaped stepping motor or actuator.

2. Description of the Related Art

Heretofore, a brushless motor can be cited as a model suitable for a small motor. Examples of a brushless motor of which the driving circuit is simple include a small cylindrical stepping motor which uses a permanent magnet, such as that shown in FIG. 16.

FIG. 16 is a cross-sectional view illustrating the internal configuration of a stepping motor according to a known example.

In FIG. 16, a stator coil 105 is wound around a bobbin 101 concentrically, and the bobbin 101 is sandwiched and fixed with two stator yokes 106 from the shaft direction. With the stator yoke 106, stator gear teeth 106a and 106b are alternately disposed in the circumferential direction of the inside diameter surface of the bobbin 101. A stator 102 is configured in a case 103 by the stator yoke 106 integrated with the stator gear tooth 106a or 106b being fixed.

Of the two cases 103, one case 103 is fixed with a flange 115 and a shaft bearing 108, and the other case 103 is fixed with another shaft bearing 108. A rotor 109 is made up of a rotor magnet 111 fixed to a rotor shaft 110. The rotor magnet 111 makes up an air gap portion in a radial pattern together with the stator yoke 106 of the stator 102. The rotor shaft 110 is supported between the two shaft bearings 108 so as to be rotated.

As for a modification of a stepping motor having the above configuration, an optical control device has been proposed (see Japanese Patent Publication No. 1978-2774, for example). An optical control device is for controlling the passage amount of light by opening/closing a shutter blade to be coupled with a stepping motor in stages. Also, as for another modification, a hollow motor has been proposed (see Japanese Patent Laid-Open No. 1982-166847, for example). A hollow motor is a stepping motor having a ring-shaped configuration, which allows light or the like to pass through the cavity of the center portion thereof.

Also, with the shutter or diaphragm adjustment mechanism of a camera or the shutter of a digital camera, or a camera which employs a silver halide film, upon attempting to subject a photographing lens to downsizing and reduction in shaft length, the photographing lens needs to be positioned before and after the shutter or diaphragm adjustment mechanism. Accordingly, thinning in the light path i.e. axial direction of the shutter or diaphragm adjustment mechanism is desired as well as high-outputting of a motor.

However, with the known small cylindrical stepping motor shown in FIG. 16, the case 103, bobbin 101, stator coil 105, and stator yoke 106 are disposed concentrically on the outer circumference of the rotor 109. Accordingly, this provides a disadvantage wherein the outer dimension of the stepping motor becomes large. Also, the magnetic flux generated by electric power being supplied to the stator coil 105 principally passes through the end surface 106a1 of the stator gear tooth 106a and the end surface 106b1 of the stator gear tooth 106b, as shown in FIG. 17. Accordingly, the magnetic flux does not act upon the rotor magnet 111 effectively, resulting in a disadvantage wherein the output power of the stepping motor is low.

Also, with the above optical control device described in Japanese Patent Publication No. 1978-2774, and the above hollow motor described in Japanese Patent Laid-Open No. 1982-166847, as with the above description, a stator coil and a stator yoke are disposed on the outer circumference of a rotor magnet. Accordingly, the outer dimension of the motor becomes great, and also the magnetic flux generated by electric power being supplied to the stator coil does not act upon the rotor magnet effectively.

In general, a camera employs a mechanism for driving a diaphragm blade, shutter, photographing lens, or the like using a motor. However, in the event that a type of motor such as shown in FIG. 16 is disposed so as to be parallel to the light axis within the lens barrel of a camera, and it is attempted to be used for driving a diaphragm blade, shutter, photographing lens, or the like, this type of motor has a solid cylindrical shape, the following problems may be encountered. The radial dimension of the lens barrel is a value obtained by adding the radial dimension of the motor to the radial dimension of the photographing lens or the radial dimension of the diaphragm opening portion, so it is difficult to suppress the diameter of the lens barrel to a sufficient small value. Also, with this type of motor, the dimension in the light axial direction is long, so it is difficult to dispose the photographing lens near the diaphragm blade or shutter blade.

On the other hand, a thin motor of which the dimension in the shaft direction is short such as shown in FIGS. 18 and 19 has been proposed (see Japanese Patent Laid-Open No. 1995-213041, and Japanese Patent Laid-Open No. 2000-50601, for example).

FIG. 18 is a perspective view illustrating the configuration of a known brushless motor, and FIG. 19 is a cross sectional view illustrating the internal configuration of the same brushless motor.

In FIGS. 18 and 19, the brushless motor comprises multiple coils 301, 302, and 303, a disc-shaped magnet 304, and so forth. The coils 301 through 303 have a thin coin shape, and the axis thereof is disposed in parallel with the axis of the magnet 304. The magnet 304 is magnetized in the shaft direction of the disc, and the magnetized surface and the axes of the coils 301 through 303 are disposed so as to face the magnet 304.

In this case, the magnetic flux to be generated from the coils 301 through 303, as shown in the arrow in FIG. 19, does not act completely effectively upon the magnet 304. Also, the rotational force which the magnet 304 generates acts at the center position of each of the coils 301 through 303, a distance L from the outer diameter of the motor. Accordingly, in spite of the size of the motor, the torque generated is small. Also, the coils 301 through 303 occupy up to near the center portion of the motor, so it is difficult to dispose another part within the motor.

Further, it is necessary to provide multiple coils 301 through 303, so this provides disadvantages such as complicating power supply control to the coils 301 through 303, and increases costs. Also, the coils 301 through 303 and the magnet 304 are disposed so as to be overlapped in the parallel direction as to the rotating shaft. Accordingly, in the event of employing this motor as a shutter or a diaphragm adjustment mechanism, the dimension in the light axial direction of the motor is long, so it is difficult to dispose the photographing lens near the diaphragm blade or shutter blade.

The present applicant has proposed a motor such as the following to solve such problems (see Japanese Patent Laid-Open No. 2003-219623 (U.S. Pat. No. 6,897,579), for example).

This motor comprises a magnet, first and second coils, and first through fourth magnetic-pole portions. The magnet is formed in a hollow disc shape, and is made up of a first flat surface orthogonal to a center virtual shaft, a second flat surface orthogonal to the virtual shaft, an outer circumferential surface, and an inner circumferential surface. Also, the magnet is retained so as to be rotated with the center thereof serving as a rotational center, and also at least a surface perpendicular to the rotational center virtual shaft is divided in the angular direction (circumferential direction) centered on the virtual shaft to be magnetized to a different polarity alternately. The first coil is disposed outside of the outer circumferential surface of the magnet, and the second coil is disposed inside of the inner circumferential surface of the magnet.

The first magnetic-pole portion faces one of the surfaces perpendicular to the virtual shaft of the rotational center of the magnet with a predetermined gap, and is magnetized by the first coil. The second magnetic-pole portion faces the other surface perpendicular to the virtual shaft of the rotational center of the magnet with a predetermined gap, and is magnetized by the first coil. The third magnetic-pole portion faces one of the surfaces perpendicular to the virtual shaft of the rotational center of the magnet with a predetermined gap, and is magnetized by the second coil. The fourth magnetic-pole portion faces the other surface perpendicular to the virtual shaft of the rotational center of the magnet with a predetermined gap, and is magnetized by the second coil. Let us say that this type of motor is referred to as a first past example for the sake of facilitating description.

With the above configuration, the length in the shaft direction of the stepping motor is determined by the thickness of the magnet, and the magnetic-pole portion facing the thickness direction of the magnet, so the dimension in the shaft direction of the stepping motor can be reduced to be very small. Also, the magnetic flux to be generated by the first coil traverses the magnet present between the first magnetic-pole portion and the second magnetic-pole portion, so acts effectively. The magnetic flux to be generated by the second coil traverses the magnet present between the third magnetic-pole portion and the fourth magnetic-pole portion, so acts effectively. Thus, a high-outputting motor can be provided.

Also, an actuator employing the same method as the motor described in the above Japanese Patent Laid-Open No. 2003-219623 (U.S. Pat. No. 6,897,579) has been proposed (see Japanese Patent Laid-Open No. 2004-45682 (U.S. Pat. No. 6,781,772), for example). This actuator comprises a magnet, a coil, and first and second magnetic-pole portions. The magnet is formed in a hollow disc shape, and is made up of a first flat surface orthogonal to a center virtual shaft, a second flat surface orthogonal to the virtual shaft, an outer circumferential surface, and an inner circumferential surface. Also, the magnet is retained so as to be rotated with the center thereof serving as a rotational center, and also at least a surface perpendicular to the rotational center virtual shaft is divided in the angular direction (circumferential direction) centered on the virtual shaft to be magnetized to a different polarity alternately. The coil is disposed outside of the outer circumferential surface of the magnet.

The first magnetic-pole portion faces one of the surfaces perpendicular to the virtual shaft of the rotational center of the magnet with a predetermined gap, and is magnetized by the coil. The second magnetic-pole portion faces the other surface perpendicular to the virtual shaft of the rotational center of the magnet with a predetermined gap, and is magnetized by the coil. Let us say that this type of actuator is referred to as a second past example for the sake of facilitating description.

Also, the following configuration can be conceived wherein a coil is disposed on the inner circumferential side of a magnet as an actuator similar to the actuator described in the above Japanese Patent Laid-Open No. 2004-45682 (U.S. Pat. No. 6,781,772). This actuator comprises a magnet, a coil, and first and second magnetic-pole portions. The magnet is formed in a hollow disc shape, and is made up of a first flat surface orthogonal to a center virtual shaft, a second flat surface orthogonal to the virtual shaft, an outer circumferential surface, and an inner circumferential surface. Also, the magnet is retained so as to be rotated with the center thereof serving as a rotational center, and also at least a surface perpendicular to the rotational center virtual shaft is divided in the angular direction (circumferential direction) centered on the virtual shaft to be magnetized to a different polarity alternately.

The coil is disposed inside of the inner circumferential surface of the magnet. The first magnetic-pole portion faces one of the surfaces perpendicular to the virtual shaft of the rotational center of the magnet with a predetermined gap, and is magnetized by the coil. The second magnetic-pole portion faces the other surface perpendicular to the virtual shaft of the rotational center of the magnet with a predetermined gap, and is magnetized by the coil. Let us say that this type of actuator is referred to as a third past example for the sake of facilitating description.

However, the motor of the above first past example (Japanese Patent Laid-Open No. 2003-219623 (U.S. Pat. No. 6,897,579)) is a rotating member serving as output means, i.e., the magnet faces the first through fourth magnetic-pole portions with a gap. Accordingly, the thickness in the shaft direction of the motor is the dimension of sum of at least the first magnetic-pole portion, the gap between the magnet and the first magnetic-pole portion, the magnet, the gap between the magnet and the second magnetic-pole portion, and the second magnetic-pole portion. Or else, this is the dimension of sum of the third magnetic-pole portion, the gap between the magnet and the third magnetic-pole portion, the magnet, the gap between the magnet and the fourth magnetic-pole portion, and the fourth magnetic-pole portion.

Also, the rotational output of the magnet needs to be extracted from between the first magnetic-pole portion and the third magnetic-pole portion, or between the second magnetic-pole portion and the fourth magnetic-pole portion using a pin or the like. Extracting the output as a rotational shaft, such as a normal motor, further needs a member such as a disc or the like engaged with the above pin, and this makes the thickness of the motor further great in some cases.

Also, the actuator of the above second past example (Japanese Patent Laid-Open No. 2004-45682 (U.S. Pat. No. 6,781,772)) is also a rotating member serving as output means, i.e., the magnet faces the first and second magnetic-pole portions with a gap. Accordingly, the thickness in the shaft direction of the motor is the dimension of sum of at least the first magnetic-pole portion, the gap between the magnet and the first magnetic-pole portion, the magnet, the gap between the magnet and the second magnetic-pole portion, and the second magnetic-pole portion.

Also, the actuator according to the above third past example is a rotating member serving as output means, i.e., the rotational output of the magnet needs to be extracted from between the teeth of the first magnetic-pole portion and the second magnetic-pole portion, or from the outer circumferential side of the magnet using a pin or the like. Accordingly, the position for extracting the rotational output is stipulated, and the degree of freedom in the case of employing an actuator are restricted in some cases. Also, the magnet is fit to a member such as the bobbin outside of the coil or the like, so friction therebetween is great, it is sometimes difficult to obtain stable performance.

SUMMARY OF THE INVENTION

The present invention provides an easy-to-assemble low-cost driving device having a thin shape wherein the dimension in the shaft direction is very small, and high output wherein torque loss due to friction is small.

A first aspect of the present invention provides a driving device, comprising: a magnet having an annular shape, retained so as to be rotated in a plane about an axis passing through substantially the center of the annulus, with at least one of the surfaces of the magnet being substantially perpendicular to the axis of rotation and having adjacent areas magnetized to different polarities; a concentric coil disposed outside and overlapping said magnet in the plane of rotation; a yoke including a first magnetic-pole portion facing said at least one of the surfaces of said magnet with a predetermined first gap therebetween, and including magnetic-poles having a tooth shape extending in the diameter direction of said magnet, and also magnetized by said coil, and a cylindrical portion covering the outer circumferential portion of said coil; and a rotating yoke including a second magnetic-pole portion fixed to the opposite surface of said magnet, and rotatable integrally with said magnet, and also magnetized by said coil; wherein the cylindrical portion of said yoke and said rotating yoke face each other across a second gap in the radial direction.

A second aspect of the present invention provides a driving device, comprising: a magnet having an annular shape, retained so as to be rotated in a plane about an axis passing through substantially the center of the annulus, with at least one of the surfaces of the magnet being substantially perpendicular to the axis of rotation and having adjacent areas magnetized to different polarities; a concentric coil disposed inside and overlapping said magnet in the plane of rotation; a yoke including a first magnetic-pole portion facing said at least one of the surfaces of said magnet with a predetermined first gap therebetween, and including magnetic-poles in a tooth shape extending in the diameter direction of said magnet, and also magnetized by said coil, and a cylindrical portion covering the inner circumferential portion of said coil; and a rotating yoke including a second magnetic-pole portion fixed to the opposite surface of said magnet, and rotatable integrally with said magnet, and also magnetized by said coil; wherein the cylindrical portion of said yoke and said rotating yoke face each other across a second gap in the axial direction.

A third aspect of the present invention provides a driving device, comprising: a magnet having an annular shape, retained so as to be rotated in a plane about an axis passing through substantially the center of the annulus, with at least one of the surfaces of the magnet being substantially perpendicular to the axis of rotation and having adjacent areas magnetized to different polarities; a first coil disposed outside and overlapping said magnet in the plane of rotation, and also having the same concentricity as said magnet; a second coil disposed inside and overlapping said magnet in the plane of rotation, and also having the same concentricity as said magnet; a first yoke including a first magnetic-pole portion facing said at least one of the surfaces of said magnet with a predetermined gap therebetween, and having magnetic-poles in a tooth shape extending in the inside diameter direction of said magnet, and also magnetized by said first coil, and a cylindrical portion covering the outer circumferential portion of said coil; a second yoke including a second magnetic-pole portion facing said one of the surfaces of said magnet with a predetermined gap, and having magnetic-poles in a tooth shape extending in the outside diameter direction of said magnet, and also magnetized by said second coil, and a cylindrical portion covering the inner circumferential portion of said coil; and a rotating yoke including a third magnetic-pole portion fixed to the opposite surface of said magnet, and rotatable integrally with said magnet, and also magnetized by said first or second coil; wherein the cylindrical portion of said first yoke and said rotating yoke face each other across a gap in the radial direction, and the cylindrical portion of said second yoke and said rotating yoke face each other across a gap in the direction of the axis of rotation.

The above configurations can provide an easy-to-assemble low-cost driving device having a thin shape wherein the dimension in the shaft direction is very small, and high output wherein torque loss due to friction is small.

Further features of the present invention will become apparent from the following description of exemplary embodiments with reference to the attached drawings.

DESCRIPTION OF THE EMBODIMENTS

Hereinafter, the present invention will be described in detail based on the drawings.

The stepping motor and driving device according to the present invention are as shown in the following first through third embodiments.

First Embodiment

Figure 1:
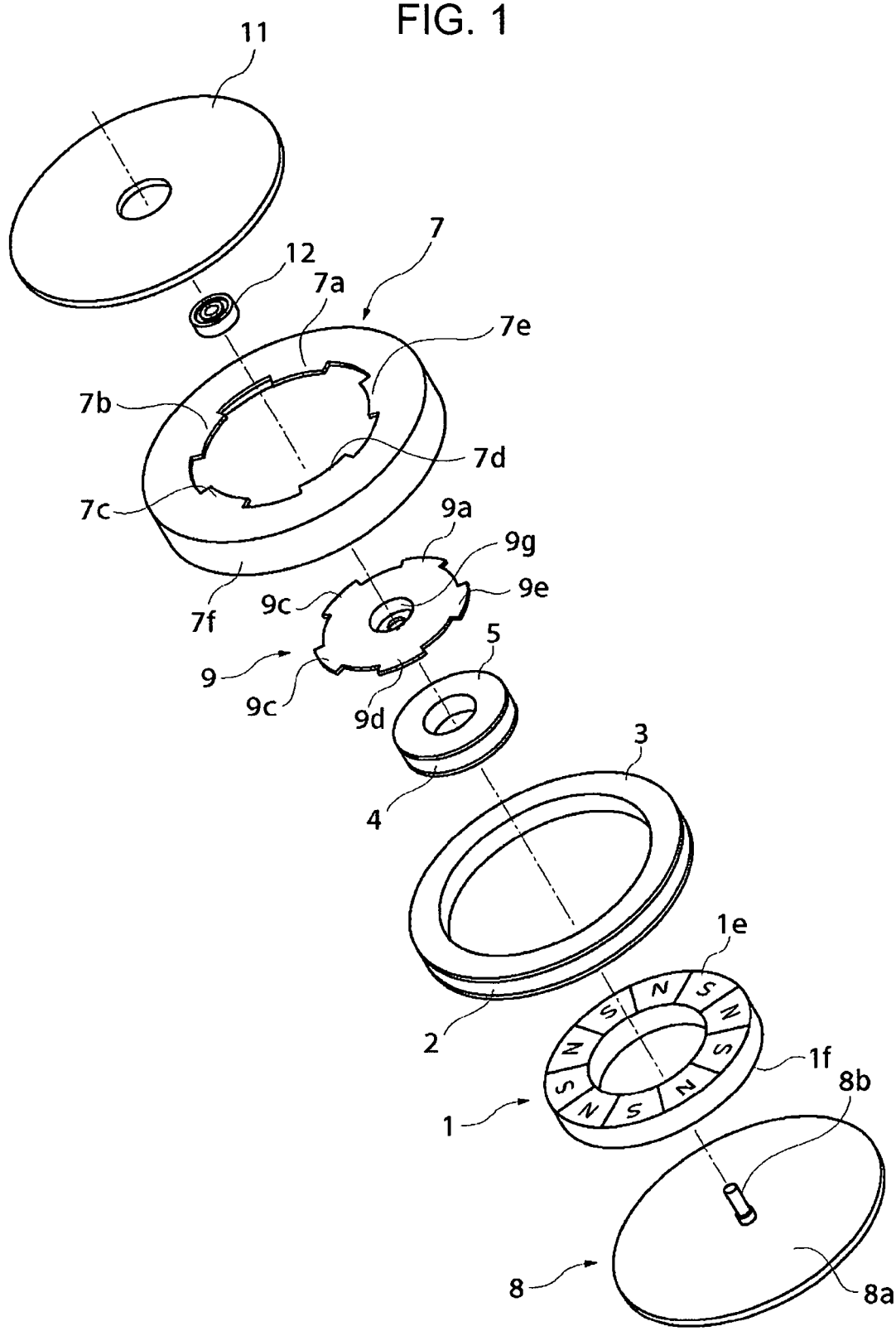
FIG. 1 is an exploded perspective view illustrating the configuration of a stepping motor serving as a driving device according to a first embodiment of the present invention.
Figure 2:
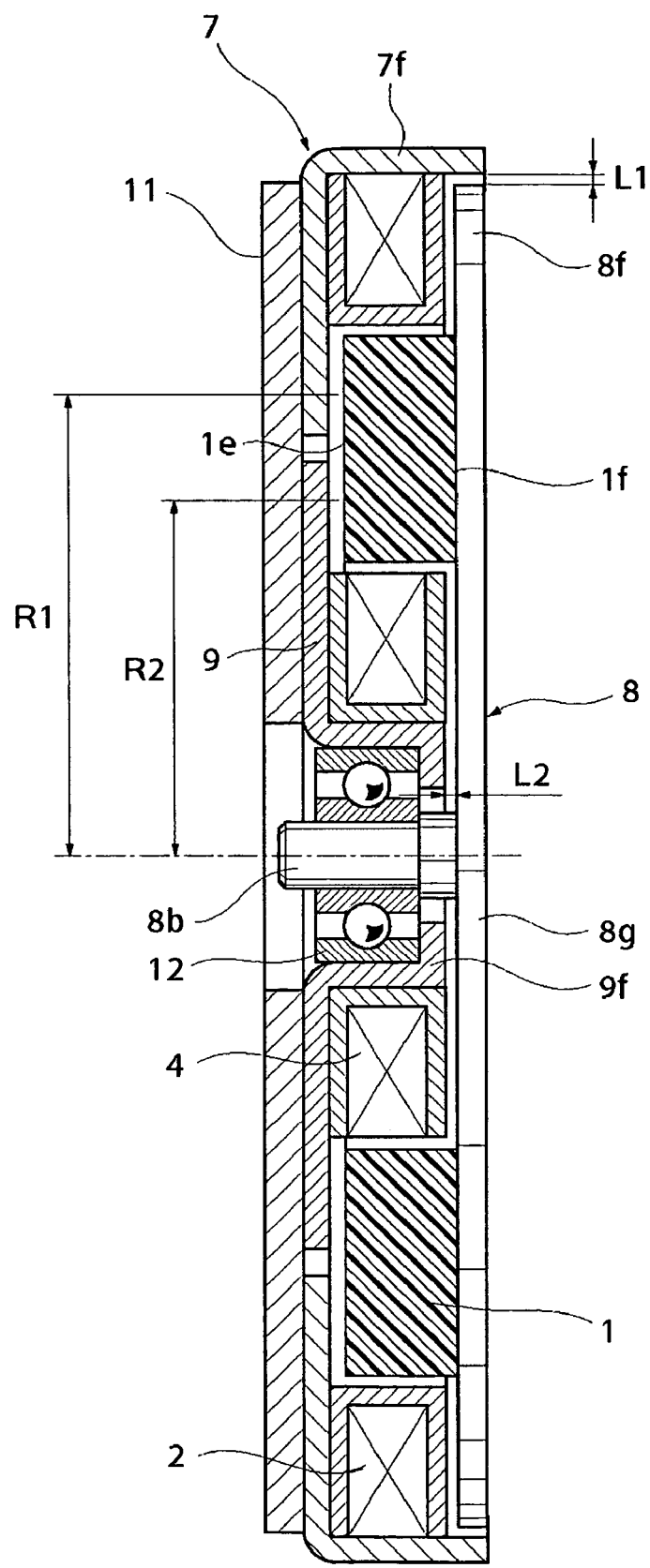
FIG. 2 is a cross-sectional view illustrating the internal configuration in the shaft direction in an assembled state of the stepping motor shown in FIG. 1.

FIG. 1 is an exploded perspective view illustrating the configuration of a stepping motor serving as a driving device according to a first embodiment of the present invention. FIG. 2 is a cross-sectional view illustrating the internal configuration in the shaft direction in an assembled state of the stepping motor. FIGS. 3 through 6 are diagrams for describing the rotational action of a magnet in this embodiment.

In FIGS. 1 through 6, the stepping motor includes a magnet 1, a first coil 2, a first bobbin 3, a second coil 4, a second bobbin 5, a first yoke 7, a rotating yoke 8, a second yoke 9, a base 11, and a shaft bearing 12.

The magnet 1 is formed in a flat annular or toric shape, comprising first and second flat surfaces orthogonal to a center virtual shaft (i.e. an axis of rotation), an outer circumferential surface, and an inner circumferential surface, and also is retained with the virtual shaft serving as the rotational center so as to be rotated. Also, as shown in FIG. 3 through FIG. 6, with the magnet 1, a surface (first flat surface or second flat surface) 1e orthogonal to the virtual shaft is divided into n divisions (10 divisions in the present embodiment) in the angular direction (circumferential direction) centered on the virtual shaft, which are magnetized with the south polarity and north polarity alternately. Note that the other surface 1f of the magnet 1 may be divided and magnetized with the reverse polarity of the one surface 1e (hereinafter, referred to as magnetized portion 1e), or may not be magnetized at all.

Also, the magnet 1 is made up of a plastic magnet material which is formed by injection molding. Thus, the thickness direction of the disc-shaped stepping motor, i.e., the length in the shaft direction can be configured very thin. With the magnet formed with injection molding, a thin resin film is formed on the surface thereof, so occurrences of rust are extremely low as compared with a magnet formed with compression molding, such that antirust processing such as paint application can be eliminated. Further, the magnet formed with injection molding has no adhesion of magnetic powder which provides a problem when employing magnets formed with compression molding, and no swelling of the surface which readily occurs at the time of antirust coating, and can achieve improvement of quality.

As for the materials of the magnet 1, Nd—Fe—B rare-earth magnetic powder, and a plastic magnet material formed by subjecting a mixture with a thermoplastic resin binder material such as a polyamide resin to injection molding are employed. Thus, while bending strength in the case of the magnet formed with compression molding is around 5000 N/cm$^2$, bending strength of 8000 N/cm$^2$ or more can be obtained in the case of employing a polyamide resin as a binder material of the magnet formed with injection molding. As a result, the magnet 1 can be formed in a thin toric shape which can not be formed with compression molding.

The magnet 1 is formed in a thin toric shape, whereby the gap between the first magnetic-pole portion of the first yoke 7 and the third magnetic-pole portion of the rotating yoke 8, and the gap between the second magnetic-pole portion of the second rotating yoke 9 and the third magnetic-pole portion of the rotating yoke 8, which will be described later, can be set to be reduced, and the magnetic circuit of which the magnetic resistance therebetween is small can be provided. Thus, in the event of electric power being supplied to the first coil 2 and the second coil 4, many magnetic fluxes can be generated even with small magnetomotive force, thereby improving the performance of the stepping motor.

The first coil 2 is formed in a toric shape, and is wound around the first bobbin 3 made up of an insulating material. The first coil 2 is disposed in the position overlapped in the direction perpendicular to the virtual shaft outside of the outer circumferential surface of the magnet 1 so as to have the same concentricity as the magnet 1. The length in the shaft direction of the first coil 2 is set to generally the same dimension as the length in the shaft direction (toric thickness) of the magnet 1.

The second coil 4 is formed in a toric shape, and is wound around the second bobbin 5 made up of an insulating material. The second coil 4 is disposed in the position overlapped in the direction perpendicular to the virtual shaft outside of the inner circumferential surface of the magnet 1 so as to have the same concentricity as the magnet 1. The length in the shaft direction of the second coil 4 is set to generally the same dimension as the length in the shaft direction (toric thickness) of the magnet 1.

The first yoke 7 is formed of a soft magnetic material, and includes first magnetic-pole portions 7a, 7b, 7c, 7d, and 7e which are magnetized by electric power being supplied to the first coil 2. The first magnetic-pole portions 7a through 7e are disposed in a state facing the magnetized portion 1e of the magnet 1 with a predetermined gap, and also comprise magnetic-poles in a tooth shape extending in the inside diameter direction of the magnet 1, as shown in FIG. 2. The number of the magnetic-pole teeth of the first magnetic-pole portions 7a through 7e is set to "the number of n magnetized divisions of the magnet ½" (five teeth in the present embodiment), and these are equally disposed by 720/n degrees (72 degrees in the present embodiment). The first magnetic-pole portions 7a through 7e are all magnetized so as to mutually have the same polarity by electric power being supplied to the first coil 2.

The second yoke 9 is formed of a soft magnetic material, and has second magnetic-pole portions 9a, 9b, 9c, 9d, and 9e which are magnetized by electric power being supplied to the second coil 4. The second magnetic-pole portions 9a through 9e are disposed in a state facing the magnetized portion 1e of the magnet 1 with a predetermined gap as shown in FIG. 2, and also comprise magnetic-poles in a tooth shape extending in the outside diameter direction of the magnet 1. The number of the magnetic-pole teeth of the second magnetic-pole portions 9a through 9e is set to "the number of n magnetized divisions of the magnet ½" (five teeth in the present embodiment), and these are equally disposed by 720/n degrees (72 degrees in the present embodiment). The second magnetic-pole portions 9a through 9e are all magnetized so as to mutually have the same polarity by electric power being supplied to the second coil 4.

The rotating yoke 8 is formed of a soft magnetic material, and comprises a disc flat surface portion 8a, and a shaft 8b. The rotating yoke 8 is supported with a shaft bearing 12 so as to be rotated integrally with the magnet 1 as well as the surface 1f of the magnet 1 being firmly fixed to the disc flat surface portion 8a. With the rotating yoke 8, the portions facing the first magnetic-pole portions 7a through 7e of the first yoke 7 are magnetized to the reverse polarities of the first magnetic-pole portions 7a through 7e by electric power being supplied to the first coil 2. Hereinafter, these portions are referred to as a 3-1st magnetic-pole portion. Also, with the rotating yoke 8, the portions facing the second magnetic-pole portions 9a through 9e of the second yoke are magnetized to the reverse polarities of the second magnetic-pole portions 9a through 9e by electric power being supplied to the second coil 4. Hereinafter, these portions are referred to as a 3-2nd magnetic-pole portion.

With the present stepping motor, the above first coil 2, first yoke 7, and rotating yoke 8 make up a first magnetic circuit, and also the above second coil 4, second yoke 9, and rotating yoke 8 make up a second magnetic circuit.

As shown in FIG. 2, the first yoke 7 and the rotating yoke 8 are magnetically coupled at the reverse side positions of the respective magnetic-pole portions, i.e., between the cylindrical portion 7f section of the first yoke 7 and the outermost diameter portion 8f section of the rotating yoke 8 which cover the outside diameter portion of the first coil 2 with a small gap L1 being provided in the radial direction. Also, the second yoke 9 and the rotating yoke 8 are magnetically coupled at the reverse side positions of the respective magnetic-pole portions, i.e., between the cylindrical portion 9f section of the second yoke 9 and the flat surface portion 8g section of the rotating yoke 8 which cover the inside diameter portion of the second coil 4 with a small gap L2 being provided in the shaft direction.

The first magnetic-pole portions 7a through 7e of the first yoke 7 and the second magnetic-pole portions 9a through 9e of the second yoke 9 are formed in a tooth shape extending in the radial direction along the magnetized portion 1e of the magnet 1, whereby the magnetic-pole portions can be formed while suppressing the thickness of the stepping motor to the minimum. That is to say, upon the magnetic-pole portions being formed with concavity and convexity extending in parallel to the shaft direction, the stepping motor becomes thick by just that much. On the other hand, with the present embodiment, the magnetic-pole portions are formed in the above tooth shape, so the dimension in the shaft direction of the stepping motor, i.e., the thickness can be minimized.

The positions where the first magnetic-pole portions 7a through 7e of the first yoke 7 face the magnet 1 are on the outer circumferential surface side of the magnet as to the positions where the second magnetic-pole portions 9a through 9e of the second yoke 9 face the magnet 1. If we say that the distance from the rotational center of the position on the magnet which electromagnetic force generated by the first magnetic-pole portions 7a through 7e being magnetized acts upon is R1, and the distance from the rotational center of the position on the magnet which electromagnetic force generated by the second magnetic-pole portions 9a through 9e being magnetized acts upon is R2, the relation between R1 and R2 is R1>R2.

If we say that the area where the first magnetic-pole portions 7a through 7e face the magnet 1 is S1, and the area where the second magnetic-pole portions 9a through 9e face the magnet 1 is S2, the relation between S1 and S2 is set so as to satisfy S1<S2. Thus, the electromagnetic force generated by the second magnetic-pole portions 9a through 9e being magnetized is greater than the electromagnetic force generated by the first magnetic-pole portions 7a through 7e being magnetized. The value of (electromagnetic force)× (radius which electromagnetic force acts upon), i.e., rotational torque is the same in the case of being generated by the first magnetic-pole portions 7a through 7e being magnetized, and in the case of being generated by the second magnetic-pole portions 9a through 9e being magnetized. Thus, the stepping motor of which positioning performance is improved can be provided.

The phase where the first magnetic-pole portions 7a through 7e face the magnetized portion 1e of the magnet 1 and the phase where the second magnetic-pole portions 9a through 9e face the magnetized portion 1e of the magnet 1 are set in a state shifted by (180/N) degrees (18 degrees in the present embodiment).

The shift bearing 12 is fitted and fixed to the inside diameter portion 9g of the second yoke 9, and retains the shaft 8b of the rotating yoke 8 so as to be rotated.

The base 11 is formed of a nonmagnetic material, and fixes both the first yoke 7 and the second yoke 9 while magnetically isolating both.

With the above rotating yoke 8, the amount of wobbling in the axial direction due to tilt as to the shaft direction is great at the outside diameter portion as compared with the wobbling in the radial direction, and description will be made regarding the influence to the magnetic circuit caused by the wobbling.

With the present embodiment, as shown in the above, the first yoke 7 and the rotating yoke 8 are configured so as to be magnetically coupled at the reverse side positions of the respective magnetic-pole portions, i.e., between the cylindrical portion 7f section of the first yoke 7 and the outermost diameter portion 8f section of the rotating yoke 8 which cover the outside diameter portion of the first coil 2 with a small gap L1 (see FIG. 2) being provided in the radial direction. Accordingly, the first magnetic circuit is, so to speak, a magnetic circuit which is stable without receiving the influence due to wobbling caused by the tilt as to the shaft direction.

Also, as described above, the second yoke 9 and the rotating yoke 8 are configured so as to be magnetically coupled at the reverse side positions of the respective magnetic-pole portions, i.e., between the cylindrical portion 9f section of the second yoke 9 and the flat surface portion 8g section of the rotating yoke 8 which cover the inside diameter portion of the second coil with a small gap L2 being provided in the shaft direction. The cylindrical portion 9f section of the second yoke 9 has a small diameter, so the amount of change of the above gap L2 due to the wobbling caused by the tilt as to the shaft direction is small. Accordingly, the second magnetic circuit is, so to speak, a magnetic circuit which is stable without receiving the influence of the tilt as to the shaft direction.

Next, the action of the stepping motor according to the present embodiment having the above configuration will be described in detail with reference to FIGS. 3 through 6.

Figure 3:
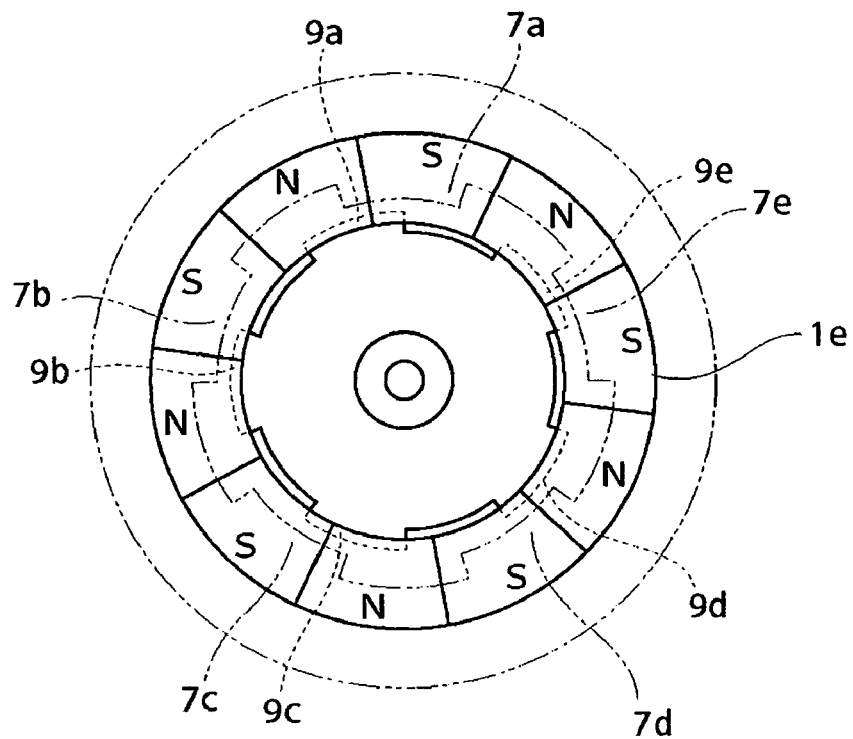
FIG. 3 is a diagram for describing the rotational action of the magnet.
Figure 4:
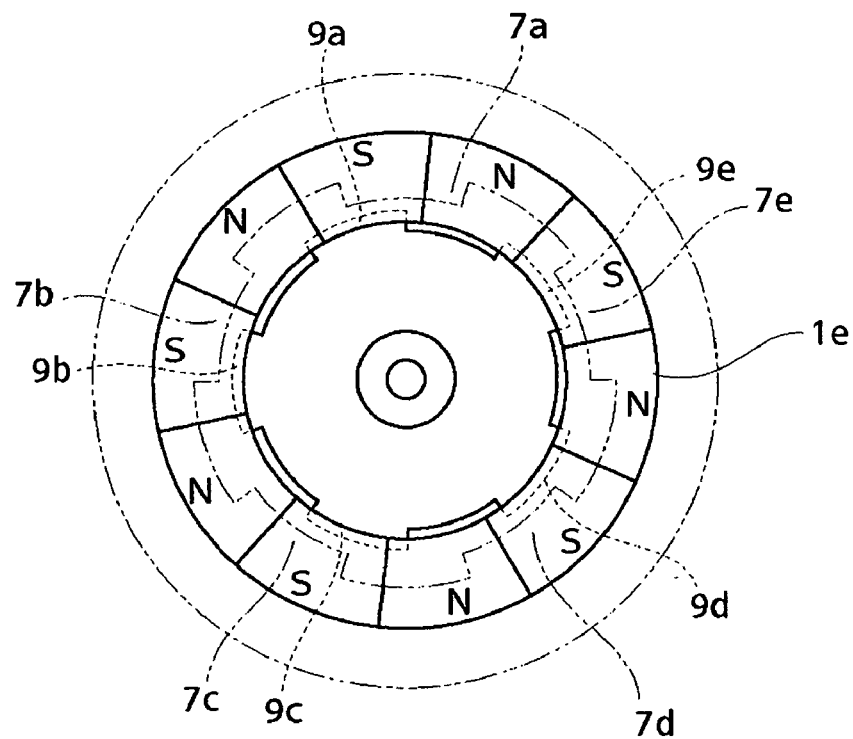
FIG. 4 is a diagram for describing the rotational action of the magnet.
Figure 5:
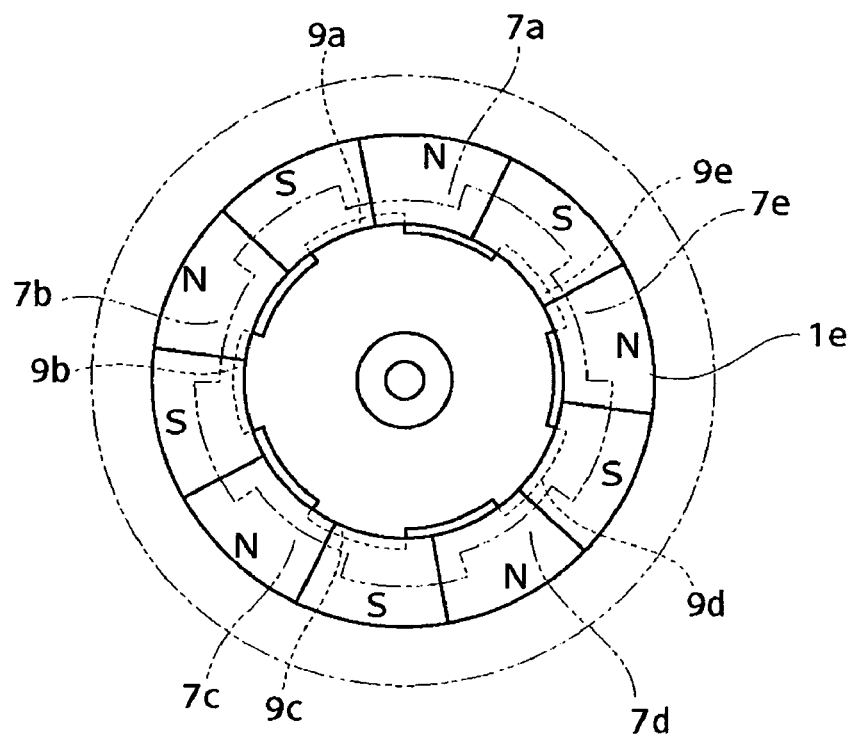
FIG. 5 is a diagram for describing the rotational action of the magnet.
Figure 6:
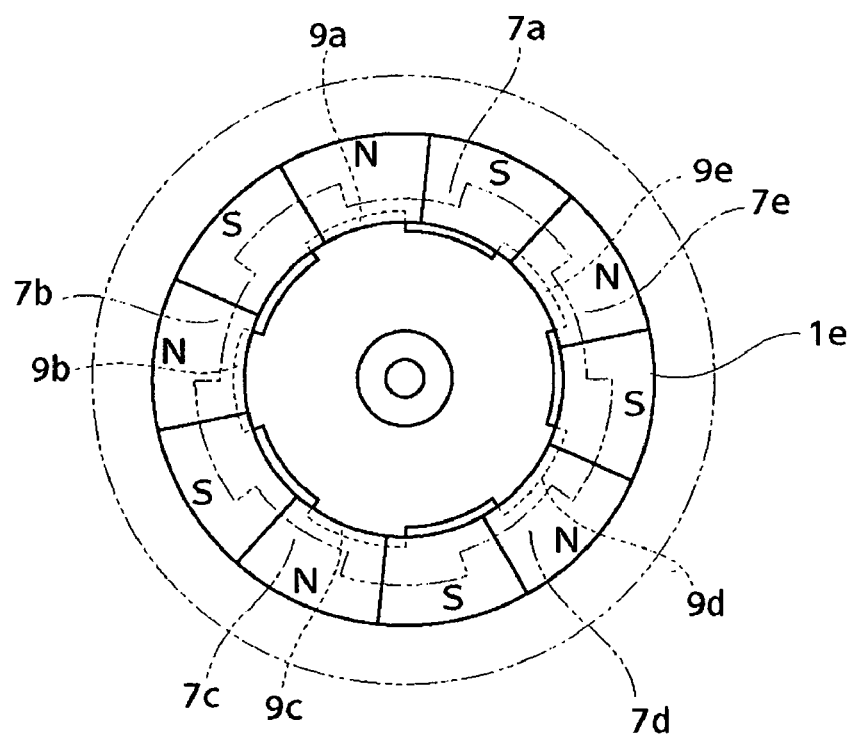
FIG. 6 is a diagram for describing the rotational action of the magnet.

FIG. 3 illustrates a magnetized state in which electric power is supplied to the first coil 2 and the second coil 4 so as to set the first magnetic-pole portions 7a through 7e of the first yoke 7, the second magnetic-pole portions 9a through 9e of the second yoke 9, and the 3-1st and 3-2nd magnetic-pole portions to the following polarities. That is to say, the first magnetic-pole portions 7a through 7e of the first yoke 7 are set to the north polarity, and the portions of the rotating yoke 8 facing the first magnetic-pole portions 7a through 7e, i.e., the 3-1st magnetic-pole portion is set to the south polarity. The second magnetic-pole portions 9a through 9e of the second yoke 9 are set to the south polarity, and the portions of the rotating yoke 8 facing the second magnetic-pole portions 9a through 9e, i.e., the 3-2nd magnetic-pole portion is set to the north polarity.

The electric power supplying direction to the second coil 4 is switched from the state in FIG. 3 to a magnetized state in which the second magnetic-pole portions 9a through 9e of the second yoke 9 are set to the north polarity, and the 3-2nd magnetic-pole portion of the rotating yoke 8 is set to the south polarity while keeping the electric power supply to the first coil 2 as it is. Thus, the magnet 1 rotates 18 degrees in the counterclockwise direction, and becomes the state shown in FIG. 4.

Next, magnetization is made so as to set the first magnetic-pole portions 7a through 7e of the first yoke 7 to the south polarity, and the 3-1st magnetic-pole portion of the rotating yoke 8 to the north polarity by inverting the electric power supply to the first coil 2. Thus, the magnet 1 further rotates 18 degrees in the counterclockwise direction, and becomes the state shown in FIG. 5.

Next, magnetization is made so as to set the second magnetic-pole portions 9a through 9e of the second yoke 9 to the south polarity, and the 3-2nd magnetic-pole portion of the rotating yoke 8 to the north polarity by inverting the electric power supply to the second coil 4. Thus, the magnet 1 further rotates 18 degrees in the counterclockwise direction, and becomes the state shown in FIG. 6.

Hereinafter, the magnet 1 serving as a rotor rotates to a position according to an electric power supply phase by switching the electric power supply direction to the first coil 2 and the second coil 4 sequentially.

Next, it will be described that the stepping motor according to the present embodiment having the above configuration is the most appropriate configuration to realize high output and also microminiaturization.

The basic configuration of the stepping motor according to the present embodiment is as follows:

(1) The magnet 1 is to be formed in a toric shape.
(2) The surface perpendicular to the virtual shaft of the rotational center of the magnet 1 is to be divided in the angular direction (circumferential direction) centered on the virtual shaft so as to be magnetized to a different polarity alternately.
(3) The first coil 2 is to be disposed in a position overlapped in the direction perpendicular to the virtual shaft outside of the outer circumferential surface of the magnet 1 so as to have the same concentricity as the magnet 1, and the second coil 4 is to be disposed in a position overlapped in the direction perpendicular to the virtual shaft inside of the inner circumferential surface of the magnet 1 so as to have the same concentricity as the magnet 1.
(4) The first magnetic-pole portions 7a through 7e of the first yoke 7, the second magnetic-pole portions 9a through 9e of the second yoke 9, and the 3-1st and 3-2nd magnetic-pole portions of the rotating yoke 8, which are magnetized by the first and second coils 2 and 4, are each to face the surface perpendicular to the shaft direction of the magnet 1, i.e., the flat surface in a toric shape.
(5) The first magnetic-pole portions 7a through 7e of the first yoke 7 are to be formed in a tooth shape extending in the radial direction.
(6) The rotating yoke 8 having the 3-1st and 3-2nd magnetic-pole portions is to be employed as an output member for extracting rotational output without any modification.

The stepping motor according to the present embodiment provides the following advantages by using the above configuration.

The magnetic flux generated by electric power being supplied to the first coil 2 traverses the magnet 1 present between the first magnetic-pole portions 7a through 7e of the first yoke 7 and the 3-1st magnetic-pole portion of the rotating yoke 8, so acts effectively.

The magnetic flux generated by electric power being supplied to the second coil 4 traverses the magnet 1 present between the second magnetic-pole portions 9a through 9e of the second yoke 9 and the 3-2nd magnetic-pole portion of the rotating yoke 8, so acts effectively.

The first coil 2 is disposed in a position overlapped in the direction perpendicular to the virtual shaft outside of the outer circumferential surface of the magnet 1 so as to have the same concentricity as the magnet 1, and the second coil 4 is disposed in the position overlapped in the direction perpendicular to the virtual shaft inside of the inner circumferential surface of the magnet 1 so as to have the same concentricity as the magnet 1. Also, the first magnetic-pole portions 7a through 7e of the first yoke 7 and the second magnetic-pole portions 9a through 9e of the second yoke 9 are formed in a tooth shape extending in the radial direction. Thus, the dimension in the shaft direction can be reduced as compared with a magnetic-pole portion made up of concavity and convexity extending in parallel to the shaft direction, whereby a stepping motor in a very thin disc shape can be provided.

The length in the shaft direction of the present stepping motor is determined with the dimension of sum of the first magnetic-pole portions 7a through 7e of the first yoke 7, the gap between the magnet 1 and the first magnetic-pole portions 7a through 7e, the magnet 1, and the third magnetic-pole portion of the rotating yoke 8. Or else, the length in the shaft direction of the present stepping motor is determined with the dimension of sum of the second magnetic-pole portions 9a through 9e of the second yoke 9, the gap between the magnet 1 and the second magnetic-pole portions 9a through 9e, the magnet 1, and the third magnetic-pole portion of the rotating yoke 8. Thus, the stepping motor according to the present embodiment is thinner than the above first past example (Japanese Patent Laid-Open No. 2003-219623 (U.S. Pat. No. 6,897,579) by the dimension of the gap between the magnet 1 and the third magnetic-pole portion.

The third magnetic-pole portion of the rotating yoke 8 made up of a soft magnetic material is fixed to the surface 1f perpendicular to the virtual shaft of the rotational center of the magnet 1, so the mechanical integrity of the magnet 1 increases. Thus, the magnet 1 even in a thin toric shape can be prevented from cracking.

The third magnetic-pole portion of the rotating yoke 8 serves as back metal, and the permeance coefficient of the magnetic circuit is set high. Thus, magnetic deterioration due to demagnetization can be reduced even in the event of employing the present stepping motor under a high-temperature environment.

The rotating yoke 8 is retained at the small-diameter shaft 8b by the shaft bearing 12 so as to be rotated, so the shaft support configuration is smaller than the above first past example, whereby the torque loss due to friction can be reduced.

The first yoke 7 and the rotating yoke 8 are magnetically coupled between the cylindrical portion 7f section of the first yoke 7 and the outermost diameter portion 8f section of the rotating yoke 8 with a small gap L1 being provided in the radial direction. Thus, the rotating yoke 8 can retain a suitable rotational state without abutting the first yoke 7, and also can form a stable magnetic circuit.

The second yoke 9 and the rotating yoke 8 are magnetically coupled between the cylindrical portion 9f section of the second yoke 9 and the flat portion 8g section of the rotating yoke 8 with a small gap L2 being provided in the shaft direction. Thus, the rotating yoke 8 can retain a suitable rotational state without abutting the second yoke 9, and also can form a stable magnetic circuit.

Also, the rotating yoke 8 is employed as an output member for extracting rotational output without any modification, so additional parts for extracting rotational output are unnecessary, and consequently the number of parts and cost can be reduced.

As described above, the present embodiment can provide an easy-to-assemble low-cost stepping motor having a thin shape wherein the dimension in the shaft direction is very small, and high output wherein torque loss due to friction is small.

Second Embodiment

Figure 7:
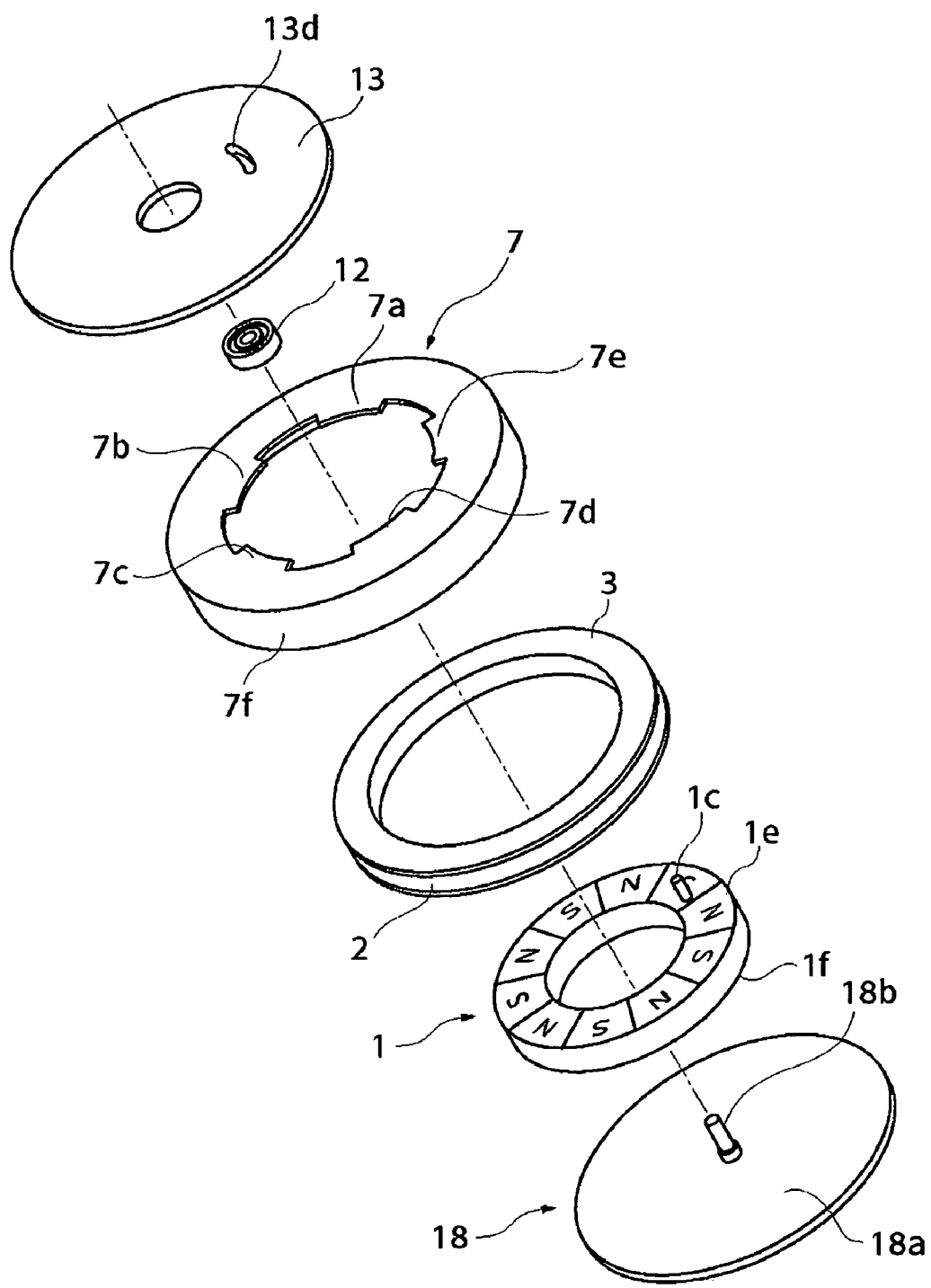
FIG. 7 is an exploded perspective view illustrating the configuration of an actuator serving as a driving device according to a second embodiment of the present invention.
Figure 8:
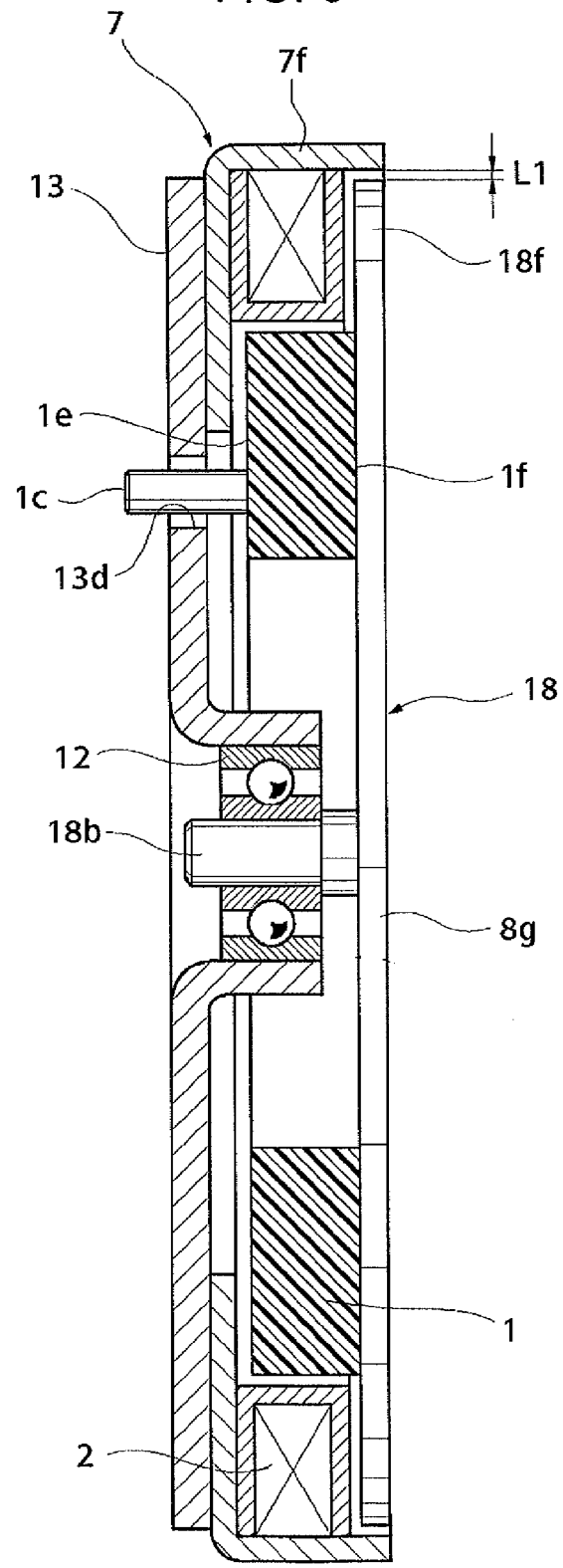
FIG. 8 is a cross-sectional view illustrating the internal configuration in the shaft direction in an assembled state of the actuator shown in FIG. 7.

The second embodiment of the present invention is different from the above first embodiment in that when citing an actuator serving as a driving device for example, the actuator has the configuration shown in FIGS. 7 and 8. With the present embodiment, the components appended with the same reference numerals as the above first embodiment (FIGS. 1 and 2) are the same as those in FIGS. 1 and 2, so the description thereof will be simplified or omitted.

Figure 9:
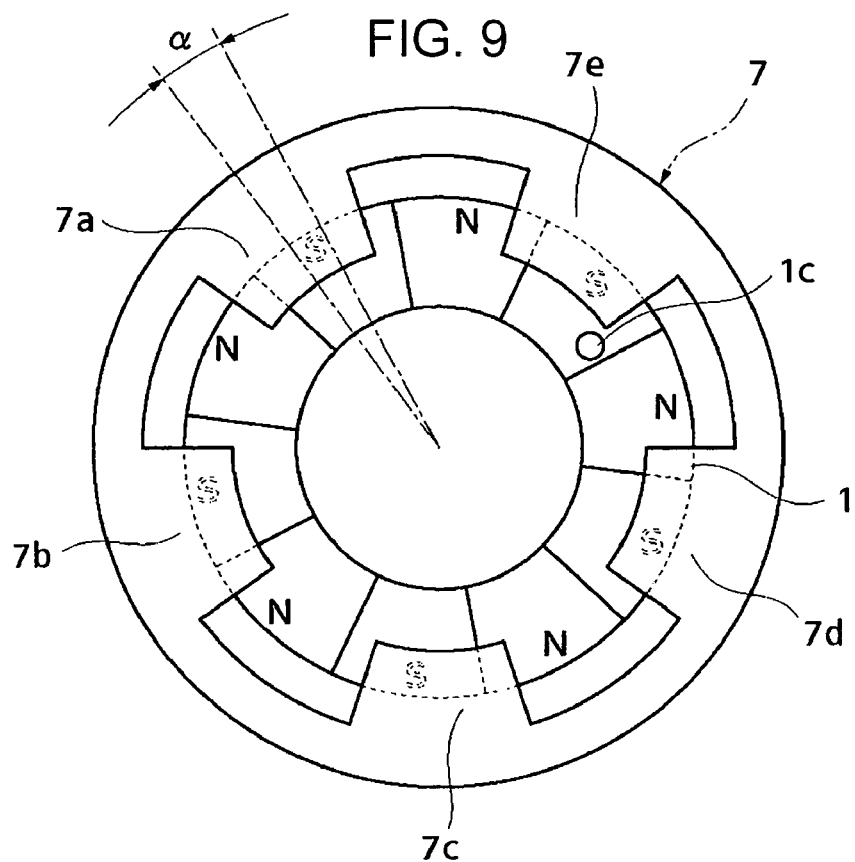
FIG. 9 is a diagram for describing the rotational action of a magnet.
Figure 10:
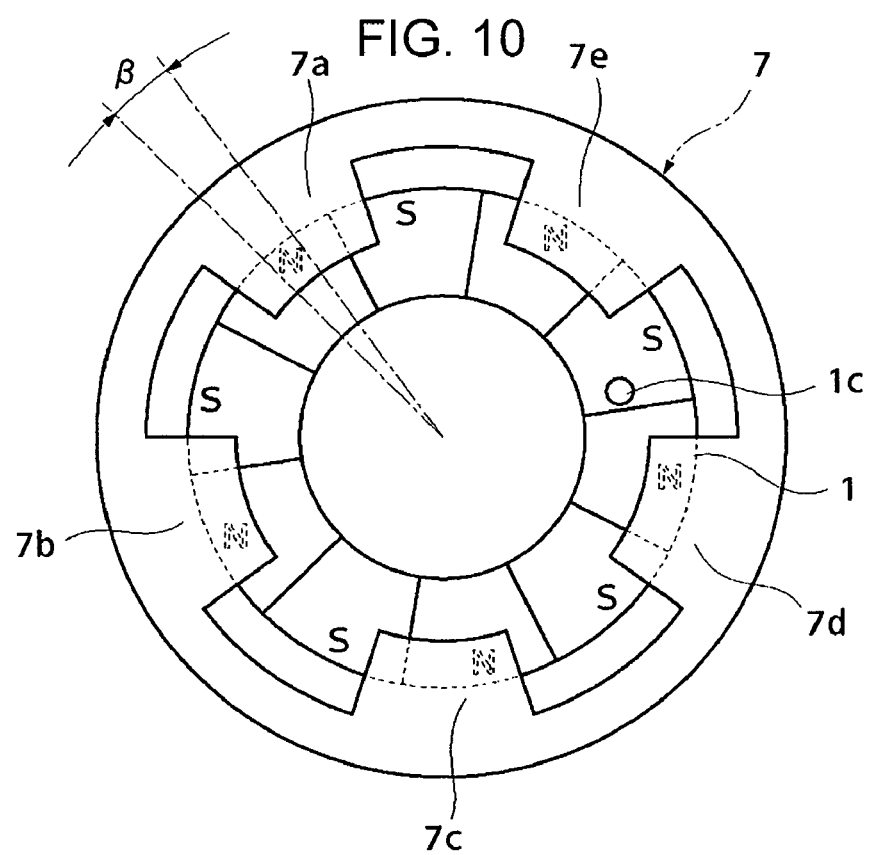
FIG. 10 is a diagram for describing the rotational action of the magnet.
Figure 11:
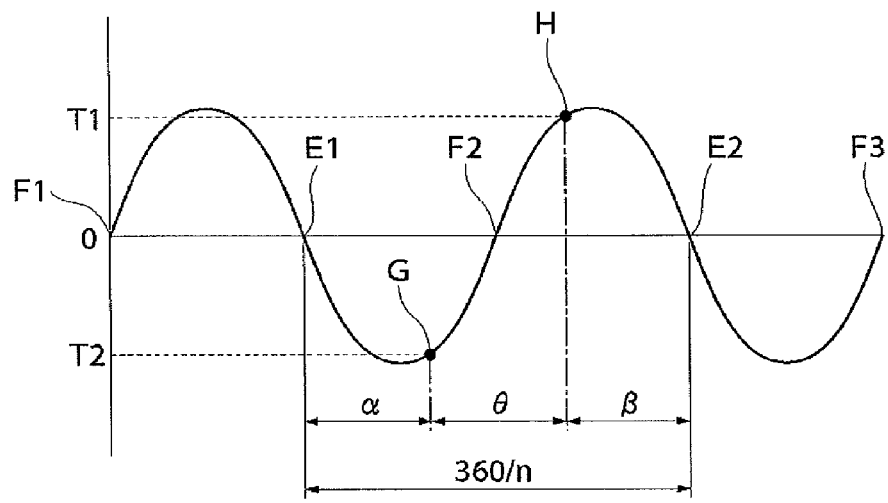
FIG. 11 is a diagram illustrating the relation between the force and rotational phase generated at the magnet.

FIG. 7 is an exploded perspective view illustrating the configuration of an actuator serving as a driving device according to the present embodiment, and FIG. 8 is a cross-sectional view illustrating the internal configuration in the shaft direction in an assembled state of the actuator. FIG. 9 and FIG. 10 are diagrams for describing the rotational action of a magnet. FIG. 11 is a diagram illustrating the relation between the force and rotational phase generated at the magnet.

In FIGS. 7 through 11, the actuator is for reciprocating by disposing a coil outside of a magnet, and comprises a magnet 1, a coil 2, a bobbin 3, a yoke 7, a rotating yoke 18, a base 13, and a shaft bearing 12. Hereinafter, description will be made primarily regarding the differences as to the first embodiment.

The magnet 1 includes a dowel 1c. As with the above first embodiment, which is divided into n divisions (10 divisions in the present embodiment) in the angular direction (circumferential direction) centered on the virtual shaft of the rotational center of a magnetized portion 1e, and these divisions are magnetized with the south polarity or the north polarity alternately. The magnet 1 is formed in a thin toric shape, whereby the later-described gap between the first magnetic-pole portions of the yoke 7 and the second magnetic-pole portion of the rotating yoke 18 can be set to be reduced, and the magnetic circuit of which the magnetic resistance therebetween is small can be provided. Thus, in the event of electric power being supplied to the coil 2, many magnetic fluxes can be generated even with small magnetomotive force, thereby improving the performance of the actuator.

The coil 2 is wound around the bobbin 3. The coil 2 is disposed in the position overlapped in the direction perpendicular to the virtual shaft outside of the outer circumferential surface of the magnet 1 so as to have the same concentricity as the magnet 1. Note that the coil 2 may be disposed in the direction perpendicular to the shaft direction of the magnet 1 on the inside of the inner circumferential surface of the magnet 1 so as to have the same concentricity as the magnet 1. With the present embodiment, description will be made regarding the former case.

The yoke 7 comprises first magnetic-pole portions 7a, 7b, 7c, 7d, and 7e. The first magnetic-pole portions 7a through 7e are all magnetized so as to mutually have the same polarity by electric power being supplied to the first coil 2.

The rotating yoke 18 is formed of a soft magnetic material, and comprises a disc flat surface portion 18a, and a shaft 18b. The rotating yoke 18 is supported with a shaft bearing 12 so as to be rotated integrally with the magnet 1 as well as the surface 1f of the magnet 1 being firmly fixed to the disc flat surface portion 18a. With the rotating yoke 18, the portions facing the first magnetic-pole portions 7a through 7e of the yoke are magnetized to the reverse polarities of the first magnetic-pole portions 7a through 7e by electric power being supplied to the first coil 2. Hereinafter, these portions are referred to as a second magnetic-pole portion.

With the present actuator, the above coil 2, yoke 7, and rotating yoke 18 make up a magnetic circuit.

As shown in FIG. 8, the yoke 7 and the rotating yoke 18 are magnetically coupled at the reverse side positions of the respective magnetic-pole portions, i.e., between the cylindrical portion 7f section of the yoke 7 and the outermost diameter portion 18f section of the rotating yoke 18 which cover the outside diameter portion of the coil 2 with a small gap L1 being provided in the radial direction.

The first magnetic portions 7a through 7e of the yoke 7 are formed in a tooth shape extending in the radial direction along the magnetized portion 1e of the magnet 1, whereby the magnetic-pole portions can be formed while minimizing the thickness of the stepping motor. That is to say, upon the magnetic-pole portions being formed with concavity and convexity extending in parallel to the shaft direction, the stepping motor becomes thick by just that much. On the other hand, with the present embodiment, the magnetic-pole portions are formed in the above tooth shape, so the dimension in the shaft direction of the stepping motor, i.e., the thickness can be minimized.

The shaft bearing 12, which is stored on the inside diameter side of the magnet 1 and also fitted and fixed to the inside diameter portion of the base 13, retains the shaft 18b of the rotating yoke 18 so as to be rotated.

The base 13 is formed of a nonmagnetic material, and fixes the yoke 7 and the shaft bearing 12. Also, the base 13 includes a slot 13d. The rotation of the magnet 1 is restricted by the dowel 1c of the magnet 1 abutting on the slot 13d in the base 13. That is to say, the magnet 1 can rotate between the positions restricted by the slot 13d of the dowel 1c. Let us say that this rotational angle is θ degrees.

With the above rotating yoke 18, the amount of wobbling due to tilt as to the shaft direction is great at the outside diameter portion as compared with the wobbling in the radial direction, and description will be made regarding the influence to the magnetic circuit caused by the wobbling.

With the present embodiment, as described above, the yoke 7 and the rotating yoke 18 are magnetically coupled at the reverse side positions of the respective magnetic-pole portions, i.e., between the cylindrical portion 7f section of the yoke 7 and the outermost diameter portion 18f section of the rotating yoke 18 which cover the outside diameter portion of the coil 2 with a small gap L1 being provided in the radial direction. Thus, a magnetic circuit which is stable without influence due to wobbling caused by the tilt as to the shaft direction can be provided.

Next, it will be described that the actuator according to the present embodiment having the above configuration is the most appropriate configuration to realize high-output and also microminiaturization.

The basic configuration of the actuator according to the present embodiment is as follows:

(1) The magnet 1 is to be formed in a toric shape.
(2) The surface perpendicular to the virtual shaft of the rotational center of the magnet 1 is to be divided in the angular direction (circumferential direction) centered on the virtual shaft so as to be magnetized to a different polarity alternately.
(3) The coil 2 is to be disposed in a position overlapped in the direction perpendicular to the virtual shaft outside of the outer circumferential surface of the magnet 1 so as to have the same concentricity as the magnet 1.
(4) The first magnetic-pole portions 7a through 7e of the yoke 7, and the second magnetic-pole portion of the rotating yoke 18 which are magnetized by the coil 2 are each to face the surface perpendicular to the shaft direction of the magnet 1, i.e., the flat surface portion in a toric shape.
(5) The first magnetic-pole portions 7a through 7e of the yoke 7 are to be formed in a tooth shape extending in the radial direction.
(6) The rotating yoke 18 having the second magnetic-pole portion is to be employed as an output member for extracting rotational output without any modification.

The actuator according to the present embodiment provides the following advantages by using the above configuration.

The magnetic flux generated by electric power being supplied to the coil 2 traverses the magnet 1 present between the first magnetic-pole portions 7a through 7e of the yoke 7 and the second magnetic-pole portion of the rotating yoke 18, so acts effectively.

The coil 2 is disposed in a position overlapped in the direction parallel to the virtual shaft outside of the outer circumferential surface of the magnet 1 so as to have the same concentricity as the magnet 1. Also, the first magnetic-pole portions 7a through 7e of the yoke 7 are formed in a tooth shape extending in the radial direction. Thus, the dimension in the shaft direction can be reduced as compared with a magnetic-pole portion made up of concavity and convexity extending in parallel to the shaft direction, whereby the actuator in a very thin disc shape can be provided.

The length in the shaft direction of the present actuator is determined with the dimension of the sum of the first magnetic-pole portions 7a through 7e of the yoke 7, the gap between the magnet 1 and the first magnetic-pole portions 7a through 7e, the magnet 1, and the second magnetic-pole portion of the rotating yoke 18. Thus, the actuator according to the present embodiment is thinner than the above second past example (Japanese Patent Laid-Open No. 2004-45682 (U.S. Pat. No. 6,781,772)) and the above third past example by the dimension of the gap between the magnet 1 and the second magnetic-pole portion.

The second magnetic-pole portion of the rotating yoke 18 made up of a soft magnetic material is fixed to the surface 1f perpendicular to the virtual shaft of the rotational center of the magnet 1, so the mechanical integrity of the magnet 1 increases. Thus, the magnet 1 even in a thin toric shape can be prevented from cracking.

The second magnetic-pole portion of the rotating yoke 18 serves as back metal, and the permeance coefficient of the magnetic circuit is set high. Thus, magnetic deterioration due to demagnetization can be reduced even in the event of employing the present actuator in a high-temperature environment.

The rotating yoke 18 is retained at the small-diameter shaft 18b by the shaft bearing 12 so as to be rotated, so the shaft support configuration is smaller than the above third past example, whereby the torque loss due to friction can be reduced.

The yoke 7 and the rotating yoke 18 are magnetically coupled between the cylindrical portion 7f section of the yoke 7 and the outermost diameter portion 18f section of the rotating yoke 18 with a small gap L1 being provided in the radial direction. Thus, the rotating yoke 18 can retain a suitable rotational state without abutting the yoke 7, and also a stable magnetic circuit can be formed.

Also, the rotating yoke 18 is employed as an output member for extracting rotational output without any modification, so parts for extracting rotational output are unnecessary, and consequently the number of parts and cost can be reduced.

FIG. 9 shows a state in which the dowel 1c of the magnet 1 abuts one of the end surfaces of the slot 13d in the base 13, and rotation in the counterclockwise direction is restricted. Also, FIG. 10 shows a state in which the dowel 1c of the magnet 1 abuts the other end surface of the slot 13d of the base 13, and rotation in the clockwise direction is restricted. The rotational position of the magnet 1 shown in FIG. 9 differs by θ degrees from the rotational position of the magnet 1 shown in FIG. 10.

The rotational position of the magnet 1 is retained in each state shown in FIGS. 9 and 10 when no electric power is supplied to the coil 2. This situation will be described with reference to FIGS. 9 through 11.

FIG. 11 illustrates the situation of cogging torque. That is to say, FIG. 11 illustrates a situation in which the rotational position of the magnet 1, and the magnet 1 is sucked in by the first magnetic-pole portions 7a through 7e of the yoke 7 when no electric power is supplied to the coil 2. The vertical axis in FIG. 11 represents the magnetic force generated between the magnet 1 and the yoke 7, which affects the magnet 1, and the horizontal axis in FIG. 11 represents the rotational phase of the magnet 1.

At points E1 and E2, upon the magnet 1 attempting to perform positive rotation, negative force acts thereupon to return to the original position, and upon the magnet 1 attempting to perform counter-rotation, positive force acts thereupon to return to the original position. That is to say, the points E1 and E2 are cogging positions where the magnet 1 is positioned at the point E1 or E2 in a stable manner by the magnetic force between the magnet 1 and the magnetic-pole portions 7a through 7e of the yoke 7.

Points F1, F2, and F3 are stopping positions in an unstable balanced state in which upon the phase of the magnet 1 deviating from a normal position, rotating force acts upon the position of the forward or backward point E1 or E2 of the magnet 1. In a state in which no electric power is supplied to the coil 2, the magnet 1 does not stop at the point F1, F2, or F3 by vibration or change in attitude, but stops at the position of the point E1 or E2.

Cogging stable points such as the point E1 or E2 are present in the cycle of 360/n degrees if we say that the number of magnetized poles of the magnet 1 is n, and the intermediate position thereof becomes an unstable point such as the point F1, F2, or F3.

With the present embodiment, in a state in which no electric power is supplied to the coil 2, the size of the first magnetic-pole portions 7a through 7e is set such that the center of a pole of the magnet 1 stops at the position facing the center of the first magnetic-pole portions 7a through 7e of the yoke 7 in a stable manner. However, even if the first magnetic-pole portions 7a through 7e are magnetized by electric power being supplied to the coil 2 from this state, no rotating force is generated at the magnet 1.

Accordingly, with the present embodiment, the relation between the dowel 1c of the magnet 1 and the slot 13d of the base 13 is set such that the magnet 1 is in the state shown in FIG. 9. That is to say, the rotational position of the magnet 1 in the counterclockwise direction is set such that the angle between the center of a pole of the magnet 1 and the center of the first magnetic-pole portions 7a through 7e of the yoke 7 is α degrees by the dowel 1c of the magnet 1 abutting the end surface of the slot 13d of the base 13.

Thus, upon the first magnetic-pole portions 7a through 7e of the yoke 7 being magnetized by electric power being supplied to the coil 2 from the state shown in FIG. 9, rotating force is generated at the magnet 1, and consequently, the stepping motor is activated in a stable manner.

Also, upon the state shown in FIG. 9 being applied to FIG. 11, the position of a point G is obtained. The cogging torque (suction force generated between the magnet 1 and the yoke 7 which affects the magnet 1) at this position is T2. This means that negative force (force in the counterclockwise direction in FIG. 9) affects the rotational direction where the magnet 1 attempts to return to the point E1. That is to say, the holding force at the position where the dowel 1c of the magnet 1 abuts the slot 13d of the base 13 is T2. Accordingly, when no electric power is supplied to the coil 2, the magnet 1 stops at this position (position shown in FIG. 9) in a stable manner.

Similarly, with the present embodiment, the rotation in the clockwise direction of the magnet 1 is set such that the position of the magnet 1 is the position shown in FIG. 10, and the end surface of the slot 13d of the base 13 abuts the dowel 1c of the magnet 1. The position of the magnet 1 in this case is set such that the angle between the center of a pole of the magnet 1 and the center of the first magnetic-pole portions 7a through 7e of the yoke 7 is β degrees.

Thus, upon the first magnetic-pole portions 7a through 7e of the yoke 7 being magnetized by electric power being supplied to the coil 2 from the state shown in FIG. 10, rotating force is generated at the magnet 1, and consequently, the stepping motor is activated in a stable manner.

Also, upon the state shown in FIG. 10 being applied to FIG. 11, the position of a point H is obtained. The cogging torque at this position is T1. This means that positive force (force in the clockwise direction in FIG. 10) affects the rotational direction where the magnet 1 attempts to proceed to the point E2. That is to say, the holding force at the position where the dowel 1c of the magnet 1 abuts the end surface of the slot 13d of the base 13 is T1. Accordingly, when no electric power is supplied to the coil 2, the magnet 1 stops at this position (position shown in FIG. 10) in a stable manner.

In the state shown in FIG. 9 and the state shown in FIG. 10, the magnet 1 is set so as to have been rotated θ degrees.

Next, the situation of rotational action of the magnet 1 will be described with reference to FIGS. 9 and 10.

As described above, let us say that the magnet 1 stops at the position shown in FIG. 9 in a stable manner at the beginning when no electric power is supplied to the coil 2. Upon the first magnetic-pole portions 7a through 7e of the yoke 7 being magnetized to the south polarity by electric power being supplied to the coil 2 from the state shown in FIG. 9, the magnet 1 serving as a rotor receives magnetic force in the rotational direction, and starts to rotate in the clockwise direction smoothly. Subsequently, power supply to the coil 2 is cut off at the timing when reaching the state shown in FIG. 10 in which the rotational angle of the magnet 1 reaches θ degrees.

The state shown in FIG. 10 is the point H in FIG. 11, so the magnet 1 retains this position in a stable manner by the holding force (cogging torque) T1 as described above. Upon electric power supply to the coil 2 being inverted from the state shown in FIG. 10, the first magnetic-pole portions 7a through 7e of the yoke 7 being magnetized to the north polarity, and the magnet 1 being rotated in the counterclockwise direction, the magnet 1 returns to the state shown in FIG. 9.

As described above, the magnet 1 serving as a rotor switches to the state shown in FIG. 9 or the state shown in FIG. 10 by switching the electric power supplying direction to the coil 2. Accordingly, the present actuator is capable of driving between two positions (the state shown in FIG. 9, and the state shown in FIG. 10), and acts as an actuator capable of retaining each position in a stable manner even at the time of no electric power supply.

As described above, the present embodiment can provide an easy-to-assemble low-cost actuator having a thin shape wherein the dimension in the shaft direction is very small, and high output wherein torque loss due to friction is small.

Third Embodiment

Figure 12:
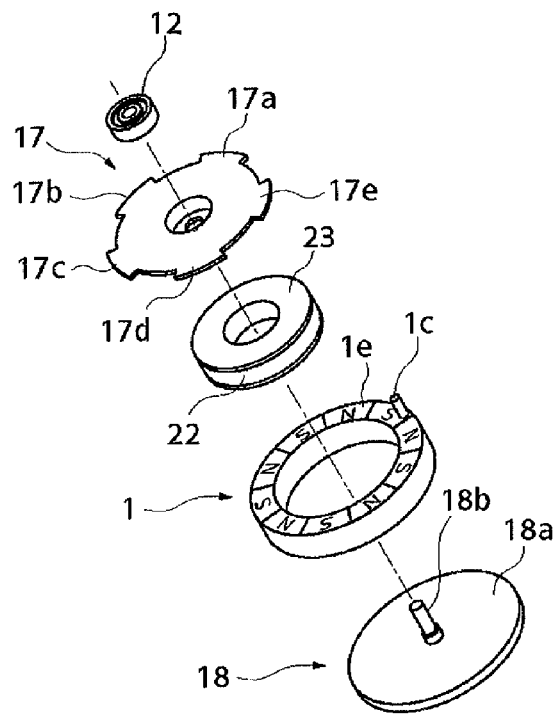
FIG. 12 is an exploded perspective view illustrating the configuration of an actuator serving as a driving device according to a third embodiment of the present invention.
Figure 13:
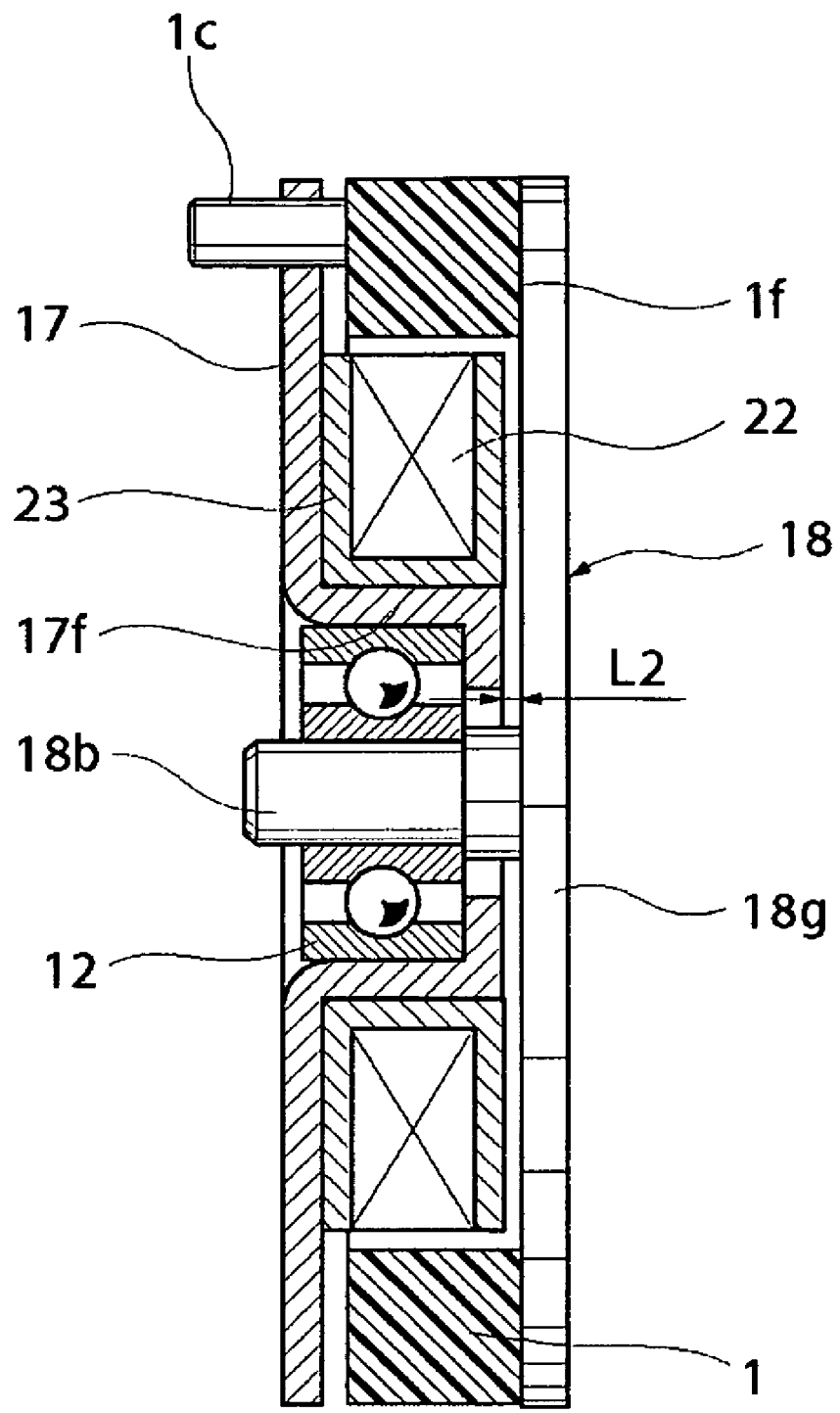
FIG. 13 is a cross-sectional view illustrating the internal configuration in the shaft direction in an assembled state of the actuator shown in FIG. 12.

The third embodiment of the present invention is different from the above first embodiment in that when citing an actuator serving as a driving device for example, the actuator has the configuration shown in FIGS. 12 and 13. With the present embodiment, the components appended with the same reference numerals as the above first embodiment (FIGS. 1 and 2) are the same as those in FIGS. 1 and 2, so the description thereof will be simplified or omitted.

Figure 14:
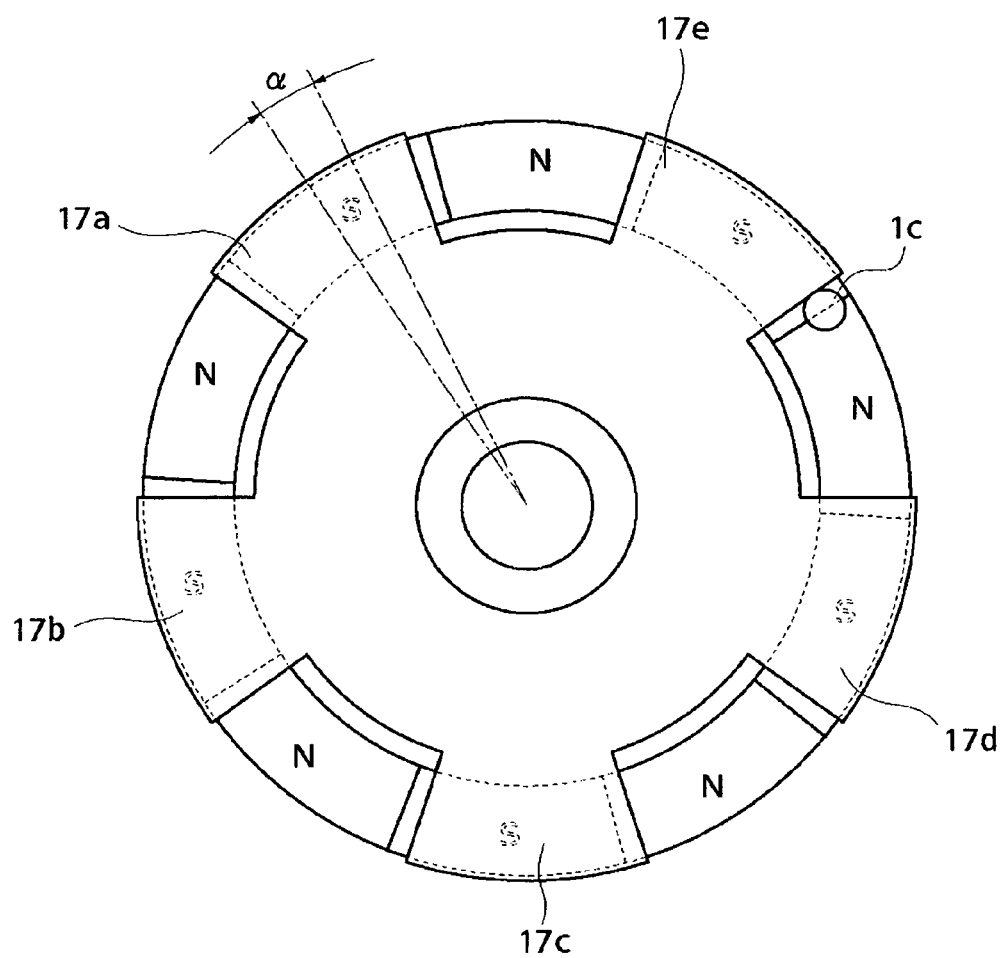
FIG. 14 is a diagram for describing the rotational action of a magnet.
Figure 15:
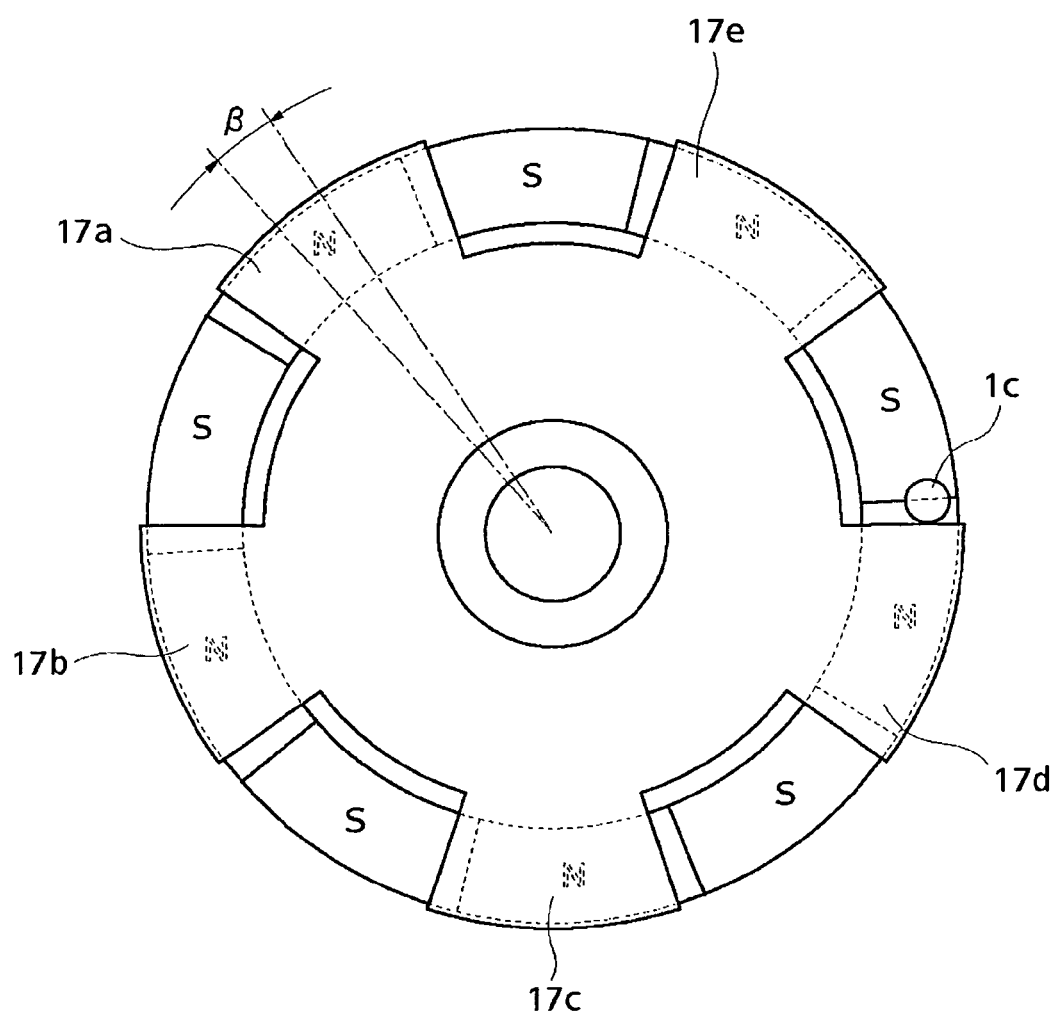
FIG. 15 is a diagram for describing the rotational action of the magnet.
Figure 16:
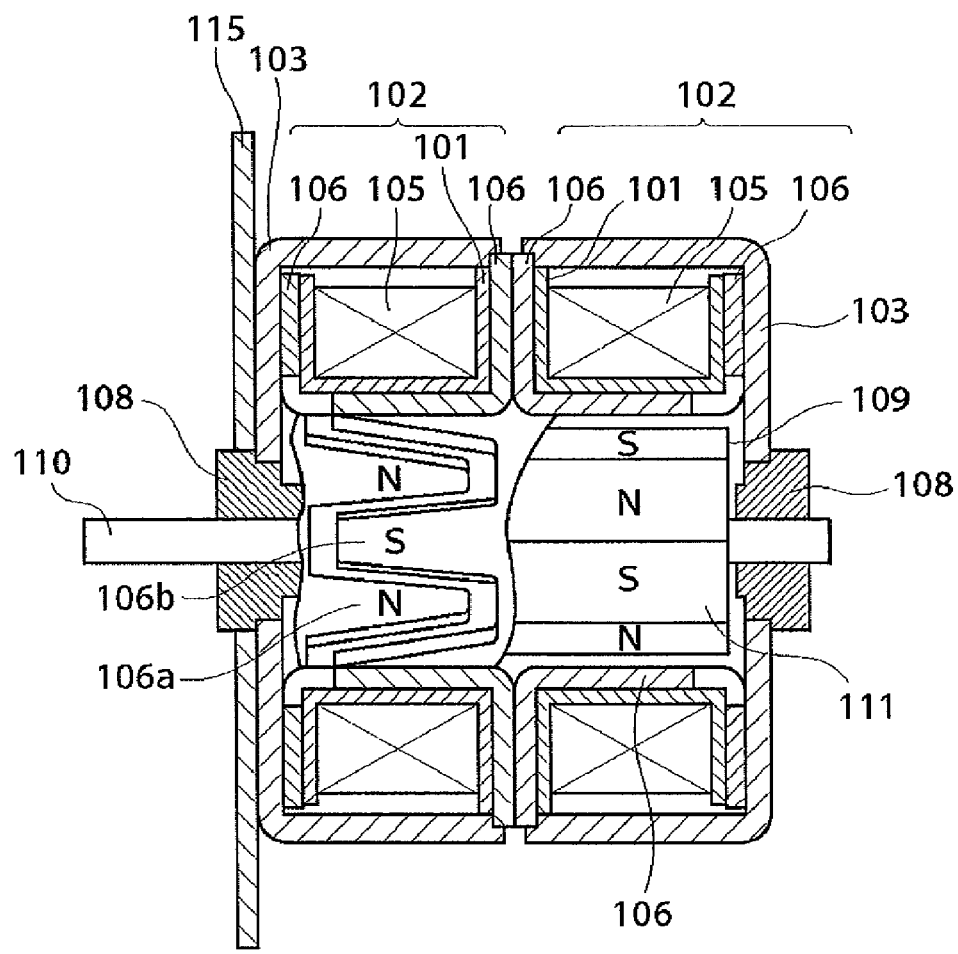
FIG. 16 is a cross-sectional view illustrating the internal configuration of a stepping motor according to a past example.
Figure 17:
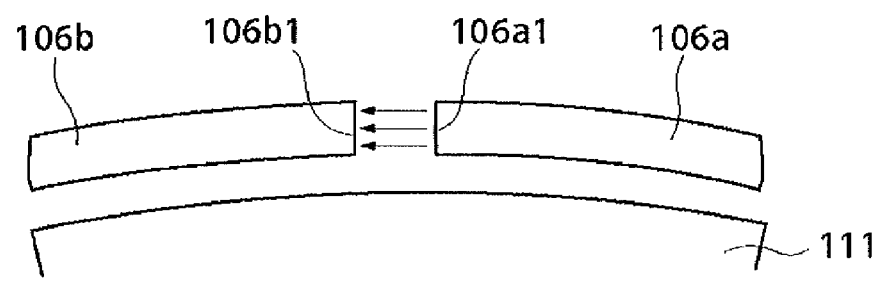
FIG. 17 is a diagram illustrating the magnetic flux generated by electric power being supplied to the stator coil of the stepping motor shown in FIG. 16.
Figure 18:
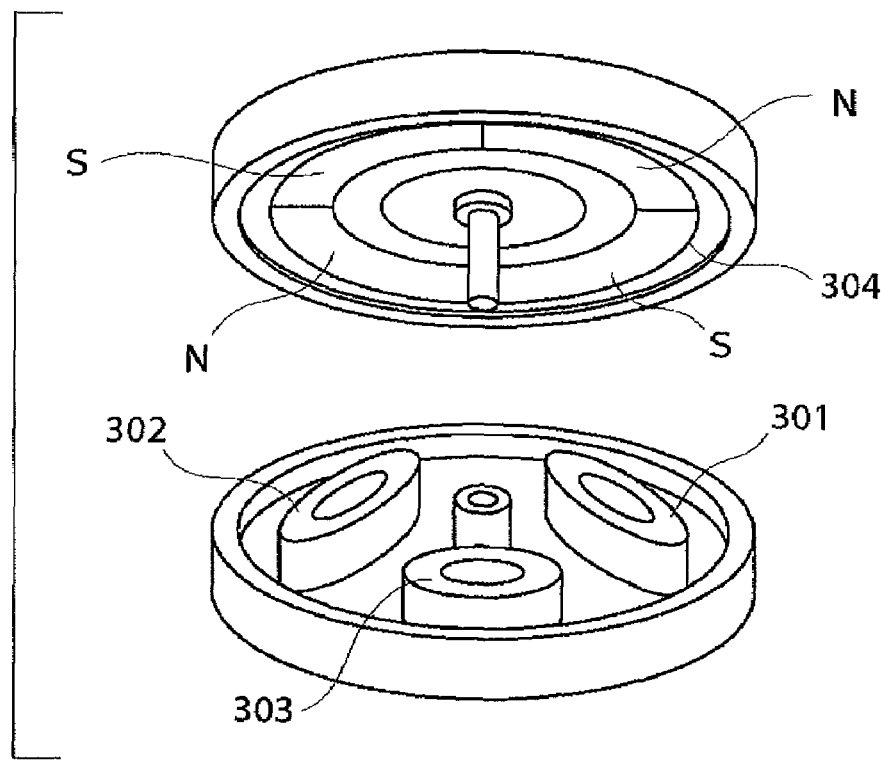
FIG. 18 is a perspective view illustrating the configuration of a brushless motor according to a known example.
Figure 19:
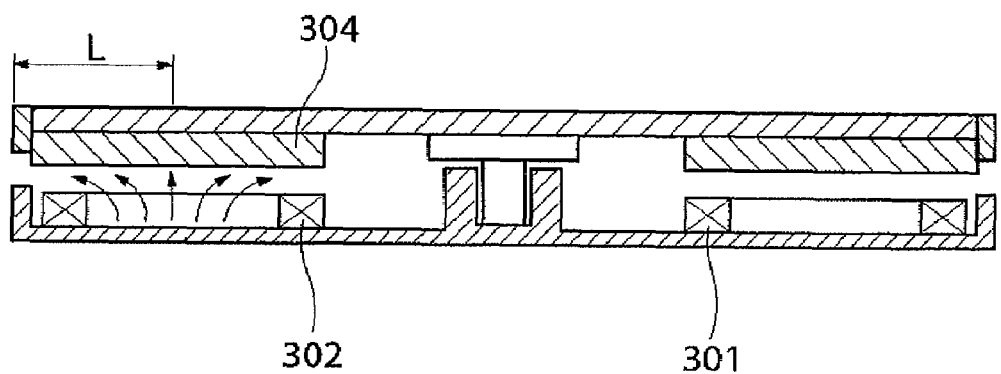
FIG. 19 is a cross-sectional view illustrating the internal configuration of the brushless motor shown in FIG. 18.

FIG. 12 is an exploded perspective view illustrating the configuration of an actuator serving as a driving device according to the present embodiment, and FIG. 13 is a cross-sectional view illustrating the internal configuration in the shaft direction in an assembly completion state of the actuator. FIGS. 14 and 15 are diagrams for describing the rotational action of a magnet.

In FIGS. 12 through 15, the actuator is for reciprocating by disposing a coil on the inside diameter side of a magnet, and comprises a magnet 1, a coil 22, a bobbin 23, a yoke 17, a rotating yoke 18, and a shaft bearing 12. Hereinafter, description will be made primarily regarding differences as to the first embodiment.

The magnet 1 includes a dowel 1c, as with the above first embodiment, and a magnetized portion 1e is divided into n divisions (10 divisions in the present embodiment) in the angular direction (circumferential direction) centered on the virtual shaft of the rotational center so as to be magnetized with the south polarity or the north polarity alternately. The magnet 1 is formed in a thin toric shape, whereby the later-described gap between the first magnetic-pole portions of the yoke 17 and the second magnetic-pole portion of the rotating yoke 18 can be set to be reduced, and the magnetic circuit of which the magnetic resistance therebetween is small can be provided. Thus, in the event of electric power being supplied to the coil 22, many magnetic fluxes can be generated even with small magnetomotive force, thereby improving the performance of the actuator.

The coil 22 is wound around the bobbin 23 made up of an insulating material. The coil 22 is disposed in the position overlapped in the direction parallel to the virtual shaft inside of the inner circumferential surface of the magnet 1 so as to have the same concentricity as the magnet 1. The length in the shaft direction of the coil 22 is set to generally the same dimension as the length in the shaft direction (toric thickness) of the magnet 1.

The yoke 17 is formed of a soft magnetic material, and includes first magnetic-pole portions 17a, 17b, 17c, 17d, and 17e, which are magnetized by electric power being supplied to the coil 22. The first magnetic-pole portions 17a through 17e face the magnetized portion 1e perpendicular to the shaft direction of the magnet 1 with a certain gap, and are made up of a magnetic-pole in a tooth shape extending in the outside diameter direction of the magnet 1. The number of the magnetic-pole teeth of the first magnetic-pole portions 17a through 17e is set to "the number of n magnetized divisions of the magnet×½" (five teeth in the present embodiment), and these are equally disposed by 720/n degrees (72 degrees in the present embodiment). The first magnetic-pole portions 17a through 17e are all magnetized so as to mutually have the same polarity by electric power being supplied to the coil 22.

The rotating yoke 18 is formed of a soft magnetic material, and comprises a disc flat surface portion 18a, and a shaft 18b. The rotating yoke 18 is supported with a shaft bearing 12 so as to be rotated integrally with the magnet 1 as well as the surface 1f of the magnet 1 being firmly fixed to the disc flat surface portion 18a. With the rotating yoke 18, the portions facing the first magnetic-pole portions 17a through 17e of the yoke 17 are magnetized to the reverse polarities of the first magnetic-pole portions 17a through 17e by electric power being supplied to the coil 22. Hereinafter, these portions are referred to as a second magnetic-pole portion.

With the present actuator, the above coil 22, yoke 17, and rotating yoke 18 make up a magnetic circuit.

The yoke 17 and the rotating yoke 18 are magnetically coupled at the reverse side positions of the respective magnetic-pole portions, i.e., between the cylindrical portion 17f section of the yoke 17 and the flat surface portion 18g section of the rotating yoke 8 which cover the inside diameter portion of the coil 22 with a small gap L2 being provided in the shaft direction. The cylindrical portion 17f section of the yoke 17 has a small diameter, so the amount of change of the above gap L2 due to the wobbling caused by the tilt as to the shaft direction is small. Accordingly, this magnetic circuit is, so to speak, a magnetic circuit which is stable without receiving the influence of the tilt as to the shaft direction.

The first magnetic portions 17a through 17e of the yoke 17 are formed in a tooth shape extending in the radial direction along the magnetized portion 1e of the magnet 1, whereby the magnetic-pole portions can be formed while minimizing the thickness of the stepping motor. That is to say, upon the magnetic-pole portions being formed with concavity and convexity extending in parallel to the shaft direction, the stepping motor becomes thick by just that much. On the other hand, with the present embodiment, the magnetic-pole portions are formed in the above tooth shape, so the dimension in the shaft direction of the stepping motor, i.e., the thickness can be minimized.

The shaft bearing 12 is fitted and fixed to the inside diameter portion of the yoke 17, and retains the shaft 18b of the rotating yoke 18 so as to be rotated.

The rotation of the magnet 1 is restricted by the dowel 1c of the magnet 1 abutting the end surfaces of the first magnetic-pole portions 17d and 17e of the above yoke 17. That is to say, the magnet 1 can rotate between the positions where the dowel 1c is restricted by the end surfaces of the first magnetic-pole portions 17d and 17e of the yoke 17. Let us say that this rotational angle is θ degrees.

Next, it will be described that the actuator according to the present embodiment having the above configuration is the most appropriate configuration to realize high-output and also microminiaturization.

The basic configuration of the actuator according to the present embodiment is as follows:

(1) The magnet 1 is to be formed in a toric shape.

(2) The surface perpendicular to the virtual shaft of the rotational center of the magnet 1 is to be divided in the angular direction (circumferential direction) centered on the virtual shaft so as to be magnetized to a different polarity alternately.

(3) The coil 22 is to be disposed in a position overlapped in the direction perpendicular to the virtual shaft outside of the outer circumferential surface of the magnet 1 so as to have the same concentricity as the magnet 1.

(4) The first magnetic-pole portions 17a through 17e of the yoke 17, and the second magnetic-pole portion of the rotating yoke 18 which are magnetized by the coil 22 are each to face the surface perpendicular to the shaft direction of the magnet 1, i.e., the flat surface portion in a toric shape.

(5) The first magnetic-pole portions 17a through 17e of the yoke 17 are to be formed in a tooth shape extending in the radial direction.

(6) The rotating yoke 18 having the second magnetic-pole portion is to be employed as an output member for extracting rotational output without any modification.

The actuator according to the present embodiment provides the following advantages by using the above configuration.

The magnetic flux generated by electric power being supplied to the coil 2 traverses the magnet 1 present between the first magnetic-pole portions 17a through 17e of the yoke 17 and the second magnetic-pole portion of the rotating yoke 18, and accordingly acts effectively.

The coil 22 is disposed in the position overlapped in the direction parallel to the virtual shaft outside of the outer circumferential surface of the magnet 1 so as to have the same concentricity as the magnet 1. Also, the first magnetic-pole portions 17a through 17e of the yoke 17 are formed in a tooth shape extending in the radial direction. Thus, the dimension in the shaft direction can be reduced as compared with a magnetic-pole portion made up of concavity and convexity extending in parallel to the shaft direction, whereby the actuator in a very thin disc shape can be provided.

The length in the shaft direction of the present actuator is determined with the dimension of sum of the first magnetic-pole portions 17a through 17e of the yoke 17, the gap between the magnet 1 and the first magnetic-pole portions 17a through 17e, the magnet 1, and the second magnetic-pole portion of the rotating yoke 18. Thus, the actuator according to the present embodiment is thinner than the above second past example and third past example by the dimension of the gap between the magnet 1 and the second magnetic-pole portion.

The second magnetic-pole portion of the rotating yoke 18 made up of a soft magnetic material is fixed to the surface 1*f* perpendicular to the virtual shaft of the rotational center of the magnet 1, so the mechanical integrity of the magnet 1 increases. Thus, the magnet 1 even in a thin toric shape can be prevented from cracking.

The second magnetic-pole portion of the rotating yoke 18 serves as back metal, and the permeance coefficient of the magnetic circuit is set high. Thus, magnetic deterioration due to demagnetization can be reduced even in the event of employing the present actuator in a high-temperature environment.

The rotating yoke 18 is retained at the small-diameter shaft 18*b* by the shaft bearing 12 so as to be rotated, so the shaft support configuration is smaller than the above third past example, whereby the torque loss due to friction can be reduced.

The yoke 17 and the rotating yoke 18 are magnetically coupled between the cylindrical portion 17*f* section of the yoke 17 and the flat surface portion 18*g* section of the rotating yoke 8 with a small gap L2 being provided in the shaft direction. Thus, the rotating yoke 18 can retain a suitable rotational state without abutting the yoke 17, and also a stable magnetic circuit can be formed.

Also, the rotating yoke 18 is employed as an output member for extracting rotational output without any modification, so parts for extracting rotational output are unnecessary, and consequently the number of parts and cost can be reduced.

Further, the rotational restriction of the magnet 1 is performed at the end surfaces of the first magnetic-pole portions 17*d* and 17*e* of the yoke 17, so a thin disc-shaped actuator of which the dimension in the shaft direction is even thinner can be provided as compared with the actuator of which rotational restriction is performed at the base shown in the above second embodiment.

FIG. 14 shows a state in which the dowel 1*c* of the magnet 1 abuts the end surface of the first magnetic-pole portion 17*e* of the yoke 17, and rotation in the counterclockwise direction is restricted. FIG. 15 is in a state in which the dowel 1*c* of the magnet 1 abuts the end surface of the first magnetic-pole portion 17*d* of the yoke 17, and rotation in the clockwise direction is restricted. The rotational position of the magnet 1 shown in FIG. 14 differs by θ degrees from the rotational position of the magnet 1 shown in FIG. 15.

The rotational position of the magnet 1 is retained in each state shown in FIGS. 14 and 15 when no electric power is supplied to the coil 2. The state shown in FIG. 14 is the same state as the state shown in FIG. 9 in the above second embodiment, and the state shown in FIG. 15 is the same state as the state shown in FIG. 10 in the above second embodiment.

With the present embodiment, as with the above second embodiment, an arrangement is made wherein the magnet 1 can move between the state shown in FIG. 14 and the state shown in FIG. 15 by switching electric power supply to the coil 22, and also each state is maintained even in a state in which electric power supply to the coil 22 is cut off.

Also, with the present embodiment, in a state in which no electric power is supplied to the coil 22, the size of the first magnetic-pole portions 17*a* through 17*e* is set such that the center of a pole of the magnet 1 stops at the position facing the center of the first magnetic-pole portions 17*a* through 17*e* of the yoke 17 in a stable manner. However, even if the first magnetic-pole portions 17*a* through 17*e* are magnetized by electric power being supplied to the coil 22 from this state, no rotating force is generated at the magnet 1.

Accordingly, with the present embodiment, the relation between the end surface of the first magnetic-pole portion 17*e* of the yoke 17 and the dowel 1*c* of the magnet 1 is arranged so as to be in the state shown in FIG. 14. That is to say, in the state in which rotation in the counterclockwise direction is restricted by the dowel 1*c* of the magnet 1 abutting the end surface of the first magnetic-pole portion 17*e* of the yoke 17, the angle between the center of a pole of the magnet 1 and the center of the first magnetic-pole portions 17*a* through 17*e* of the yoke 17 is set so as to be α degrees. Thus, upon the first magnetic-pole portions 17*a* through 17*e* of the yoke 17 being magnetized by electric power being supplied to the coil 2 from the state shown in FIG. 14, rotating force is generated at the magnet 1, and consequently, the stepping motor is activated in a stable manner.

Also, upon the state shown in FIG. 14 being applied to FIG. 11, the position of a point G is obtained. The cogging torque at this position is T2. This means that negative force (force in the anti-clockwise direction in FIG. 9) affects upon the rotational direction where the magnet 1 attempts to return to the point E1. That is to say, the holding force at the position where the dowel 1*c* of the magnet 1 abuts on the first magnetic-pole portion 17*e* of the yoke 17 is T2. Accordingly, when no electric power is supplied to the coil 22, the magnet 1 stops at this position (position shown in FIG. 14) in a stable manner.

Similarly, with the present embodiment, rotation in the clockwise direction of the magnet 1 is set such that the position of the magnet 1 is the position shown in FIG. 15, and the end surface of the first magnetic-pole portion 17*d* of the base 17 abuts the dowel 1*c* of the magnet 1. The position of the magnet 1 in this case is set such that the angle between the center of a pole of the magnet 1 and the center of the first magnetic-pole portions 17*a* through 17*e* of the yoke 17 is β degrees. Thus, upon the first magnetic-pole portions 17*a* through 17*e* of the yoke 17 being magnetized by electric power being supplied to the coil 2 from the state shown in FIG. 15, rotating force is generated at the magnet 1, and consequently, the stepping motor is activated in a stable manner.

Also, upon the state shown in FIG. 15 being applied to FIG. 11, the position of a point H is obtained. The cogging torque at this position is T1. This means that positive force (force in the clockwise direction in FIG. 15) affects the rotational direction where the magnet 1 attempts to proceed to the point E2. That is to say, the holding force at the position where the end surface of the first magnetic-pole portion 17*d* of the yoke 17 abuts on the dowel 1*c* of the magnet 1 is T1. Accordingly, when no electric power is supplied to the coil 22, the magnet 1 stops at this position (position shown in FIG. 15) in a stable manner.

In the state shown in FIG. 14 and the state shown in FIG. 15, the magnet 1 is set so as to have been rotated θ degrees.

Next, the situation of rotational actions of the magnet 1 will be described with reference to FIGS. 14 and 15.

As described above, let us say that the magnet 1 stops at the position shown in FIG. 14 in a stable manner at the beginning when no electric power is supplied to the coil 2. Upon the first magnetic-pole portions 17*a* through 17*e* of the yoke 17 being magnetized to the south polarity by electric power being supplied to the coil 22 from the state shown in FIG. 14, the magnet 1 serving as a rotor receives magnetic force in the rotational direction, and starts to rotate in the clockwise direction smoothly.

Subsequently, electric power supply to the coil 22 is cut off at the timing when reaching the state shown in FIG. 15 in which the rotational angle of the magnet 1 reaches θ degrees. The state shown in FIG. 15 is the point H in FIG. 11, so the magnet 1 retains this position in a stable manner by the cogging torque T1 as described above. Upon electric power supply to the coil 2 being inverted from the state shown in FIG. 15, the first magnetic-pole portions 17a through 17e of the yoke 17 being magnetized to the north polarity, and the magnet 1 being rotated in the counterclockwise direction, the magnet 14 returns to the state shown in FIG. 14.

As described above, the magnet 1 serving as a rotor switches to the state shown in FIG. 14 or the state shown in FIG. 15 by switching the electric power supplying direction to the coil 2. Accordingly, the present actuator is capable of driving at between two positions (the state shown in FIG. 14 and the state shown in FIG. 15), and acts as an actuator capable of retaining each position in a stable manner even at the time of no electric power supply.

As described above, the present embodiment can provide an easy-to-assemble low-cost actuator having a thin shape wherein the dimension in the shaft direction is very small, and high output wherein torque loss due to friction is small.

Other Embodiments

Description has been made regarding the stepping motor simple substance in the above first embodiment, and the actuator simple substance in the above second and third embodiments, but the present invention is not restricted to applications to the stepping motor simple substance and the actuator simple substance. The present invention can be applied to a case in which the diaphragm blade, shutter, and photographing lens of an imaging device are driven by a stepping motor or actuator.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-159857 filed May 31, 2005, which is hereby incorporated by reference herein in its entirety.

What is claimed is:

1. A driving device comprising:
   a magnet having an annular shape, retained so as to be rotated in a plane about an axis passing through substantially the center of the annulus, with at least one of the surfaces of the magnet being substantially perpendicular to the axis of rotation and having adjacent areas magnetized to different polarities;
   a concentric coil disposed outside and overlapping said magnet in the plane of rotation;
   a yoke including
      a first magnetic-pole portion facing said at least one of the surfaces of said magnet with a predetermined first gap therebetween, and including magnetic-poles having a tooth shape extending in the diameter direction of said magnet, and also magnetized by said coil, and
      a cylindrical portion covering the outer circumferential portion of said coil; and
   a rotating yoke including a second magnetic-pole portion fixed to the opposite surface of said magnet, and rotatable integrally with said magnet, and also magnetized by said coil;
   wherein the cylindrical portion of said yoke and the outermost diameter portion of said rotating yoke are configured to face with each other across a second gap in the radial direction to form a stable magnetic circuit.

2. The driving device according to claim 1, wherein said rotating yoke also serves as an output member for extracting rotational output.

3. A driving device comprising:
   a magnet having an annular shape, retained so as to be rotated in a plane about an axis passing through substantially the center of the annulus, with at least one of the surfaces of the magnet being substantially perpendicular to the axis of rotation and having adjacent areas magnetized to different polarities;
   a first coil disposed outside and overlapping said magnet in the plane of rotation, and also having the same concentricity as said magnet;
   a second coil disposed inside and overlapping said magnet in the plane of rotation, and also having the same concentricity as said magnet;
   a first yoke including
      a first magnetic-pole portion facing said at least one of the surfaces of said magnet with a predetermined gap therebetween, and having magnetic-poles in a tooth shape extending in the inside diameter direction of said magnet, and also magnetized by said first coil, and
      a cylindrical portion covering the outer circumferential portion of said coil;
   a second yoke including
      a second magnetic-pole portion facing said one of the surfaces of said magnet with a predetermined gap, and having magnetic-poles in a tooth shape extending in the outside diameter direction of said magnet, and also magnetized by said second coil, and
      a cylindrical portion covering the inner circumferential portion of said coil; and
   a rotating yoke having a flat portion and including a third magnetic-pole portion fixed to the opposite surface of said magnet, and rotatable integrally with said magnet, and also magnetized by said first or second coil;
   wherein the cylindrical portion of said first yoke and the outermost diameter portion of said rotating yoke are configured to face with each other across a gap in the radial direction to form a first stable magnetic circuit, and the cylindrical portion of said second yoke and the flat portion of said rotating yoke are configured to face each other across a gap in the direction of the axis of rotation to form a second stable magnetic circuit.

4. The driving device according to claim 3, wherein said rotating yoke also serves as an output member for extracting rotational output.

* * * * *